US011627635B2

United States Patent
Abraham et al.

(10) Patent No.: US 11,627,635 B2
(45) Date of Patent: Apr. 11, 2023

(54) EXPEDITED RELEASE OF A USER EQUIPMENT

(71) Applicant: QUALCOMM Incorporated, San Diego, CA (US)

(72) Inventors: Santosh Abraham, San Diego, CA (US); Huichun Liu, Beijing (CN); Miguel Griot, La Jolla, CA (US); Juan Zhang, Beijing (CN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/215,285

(22) Filed: Dec. 10, 2018

(65) Prior Publication Data
US 2019/0200414 A1    Jun. 27, 2019

(30) Foreign Application Priority Data

Dec. 22, 2017    (WO) ................ PCT/CN2017/118097

(51) Int. Cl.
*H04W 76/32* (2018.01)
*H04W 76/27* (2018.01)

(52) U.S. Cl.
CPC ........... *H04W 76/32* (2018.02); *H04W 76/27* (2018.02)

(58) Field of Classification Search
CPC .............................. H04W 76/27; H04W 76/32
USPC ........................................................ 370/328
See application file for complete search history.

(56) References Cited

U.S. PATENT DOCUMENTS

| 2014/0044029 | A1* | 2/2014 | Chou ................ H04W 52/0212 370/311 |
| 2016/0249408 | A1 | 8/2016 | Thiruvenkatachari et al. |
| 2017/0013672 | A1* | 1/2017 | Islam .................. H04W 72/042 |
| 2017/0041777 | A1* | 2/2017 | Huang .................. H04W 48/02 |
| 2018/0049104 | A1* | 2/2018 | Van Phan ............. H04W 76/14 |
| 2018/0213576 | A1* | 7/2018 | Koskinen ............. H04W 76/34 |

(Continued)

FOREIGN PATENT DOCUMENTS

| CN | 102111847 A | 6/2011 |
| CN | 102487541 A | 6/2012 |

(Continued)

OTHER PUBLICATIONS

International Search Report and Written Opinion—PCT/CN2017/118097—ISA/EPO—dated Mar. 1, 2018.

(Continued)

*Primary Examiner* — Peter G Solinsky
(74) *Attorney, Agent, or Firm* — Arent Fox, LLP; Dang M. Vo

(57) ABSTRACT

In order to improve efficiency in releasing a connection with a user equipment, a method, apparatus, and computer-readable medium are presented herein. A RAN receives release assistance information from a user equipment or a User Plane Function (UPF) involved in an active session with the user equipment. The release assistance information may be received over a control plane or over a user plane. The release assistance information may be received from the user equipment or the UPF over the user plane or as Radio Resource Control (RRC) signaling. The release assistance information may be received from an application function via the UPF. The RAN determines to release the user equipment based on the release assistance information.

20 Claims, 19 Drawing Sheets

(56) References Cited

U.S. PATENT DOCUMENTS

| | | | | |
|---|---|---|---|---|
| 2018/0227871 A1* | 8/2018 | Singh | ................... | H04W 60/04 |
| 2018/0279411 A1* | 9/2018 | Kang | ................... | H04W 76/32 |
| 2019/0037441 A1* | 1/2019 | Liu | ...................... | H04W 60/00 |
| 2019/0053034 A1* | 2/2019 | Kim | ..................... | H04W 76/10 |
| 2019/0090298 A1* | 3/2019 | Abraham | ............. | H04W 76/27 |
| 2019/0159282 A1* | 5/2019 | Zhu | ...................... | H04W 48/02 |
| 2019/0166641 A1* | 5/2019 | Kim | ..................... | H04W 76/15 |
| 2019/0166647 A1* | 5/2019 | Velev | .................. | H04L 5/0098 |

FOREIGN PATENT DOCUMENTS

| | | | |
|---|---|---|---|
| CN | 107438245 A | 12/2017 | |
| CN | 107438273 A | 12/2017 | |
| CN | 107484224 A | 12/2017 | |
| WO | 2017027071 A1 | 2/2017 | |
| WO | 2017078491 A1 | 5/2017 | |
| WO | 2017170122 A1 | 10/2017 | |

OTHER PUBLICATIONS

International Search Report and Written Opinion—PCT/CN2018/122769—ISA/EPO—dated Mar. 14, 2019.

* cited by examiner

EXPEDITED RELEASE OF A USER EQUIPMENT

CROSS-REFERENCE TO RELATED APPLICATION

This application claims the benefit of International Application Serial No. PCT/CN2017/118097, entitled "Expedited Release of a User Equipment" and filed on Dec. 22, 2017, which is expressly incorporated by reference herein in its entirety.

BACKGROUND

Technical Field

The present disclosure relates generally to communication systems, and more particularly, to release of a connection between a user equipment and a network.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A focus of the traditional LTE design relates to the improvement of spectral efficiency, ubiquitous coverage, and enhanced quality of service (QoS) support, etc. Current LTE system down link (DL) and uplink (UL) link budgets may be designed for coverage of high end devices, such as state-of-the-art smartphones and tablets. However, it may be desirable to support low cost low rate devices as well. Such communication may involve a reduction in a maximum bandwidth, e.g., a narrowband bandwidth, use of a single receive radio frequency (RF) chain, a reduction in peak rate, a reduction in transmit power, the performance of half duplex operation, etc. One example of such narrowband wireless communication is Narrowband-Internet of Things (NB-IoT), which may be limited to a single RB of system bandwidth, e.g., 180 kHz. Another example of narrowband wireless communication is enhanced machine type communication (eMTC), which may be limited to six RBs of system bandwidth. Narrowband wireless communication involves unique challenges due to the limited frequency dimension of the narrow band. Additionally, low power operation may be very important for such low complexity devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects presented herein improve efficiency in releasing a connection with a user equipment (UE), and therefore, enable reductions in power use by a UE.

In an aspect of the disclosure, a method, a computer-readable medium, and an apparatus are provided. The apparatus receives release assistance information at a Radio Access Network (RAN) from a UE or a User Plane Function (UPF) involved in an active session with the UE. The apparatus determines, at the RAN, to release the UE based on the release assistance information received from the UE or the UPF. Then, the apparatus releases the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
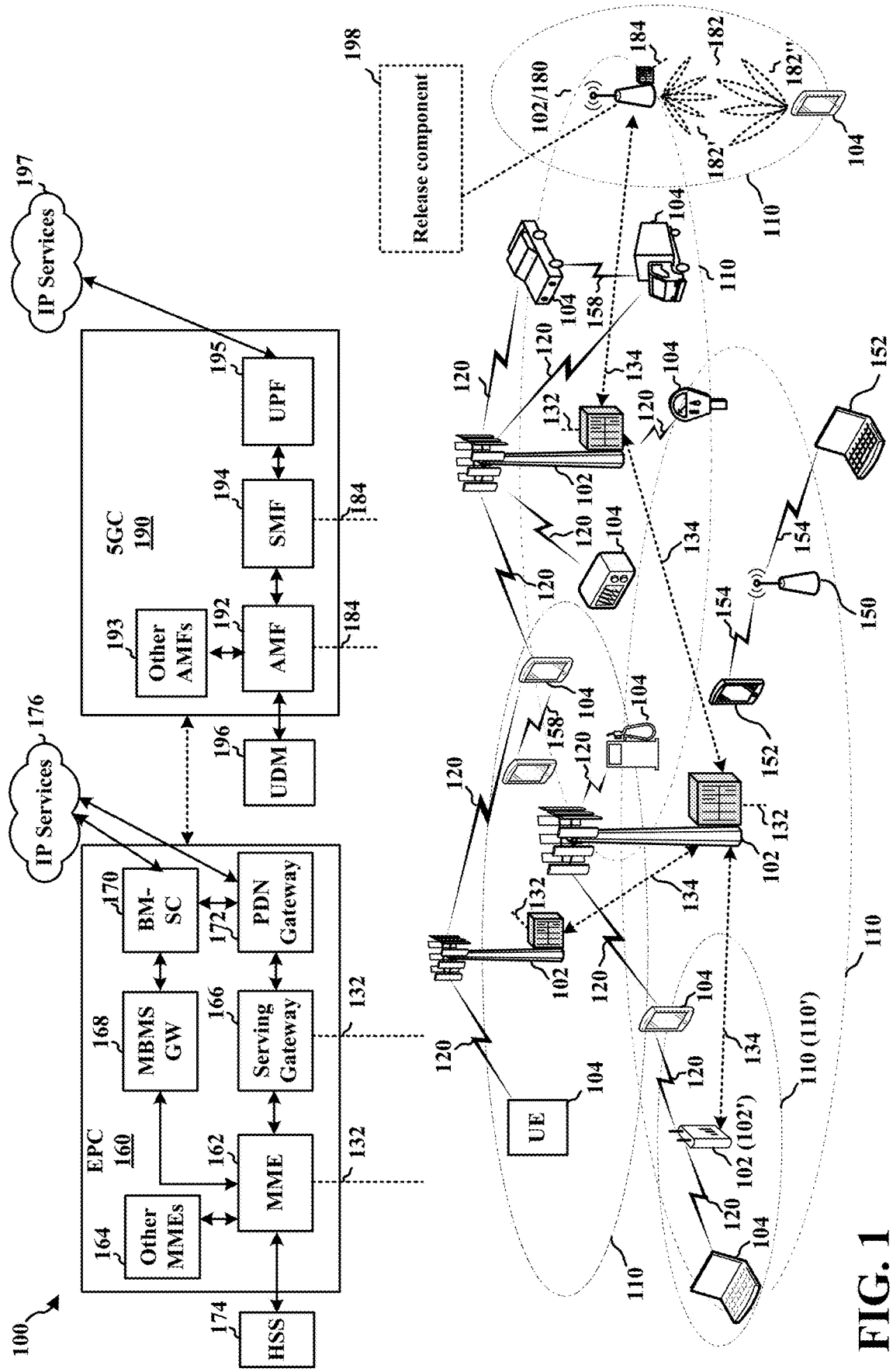
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a Core Network 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/base station 180 may include a release component 198 configured to release a connection between the network and the UE 104 based on an indication from the UE, the AF, or the UPF, as described in connection with FIGS. 4-19.

Figure 2:
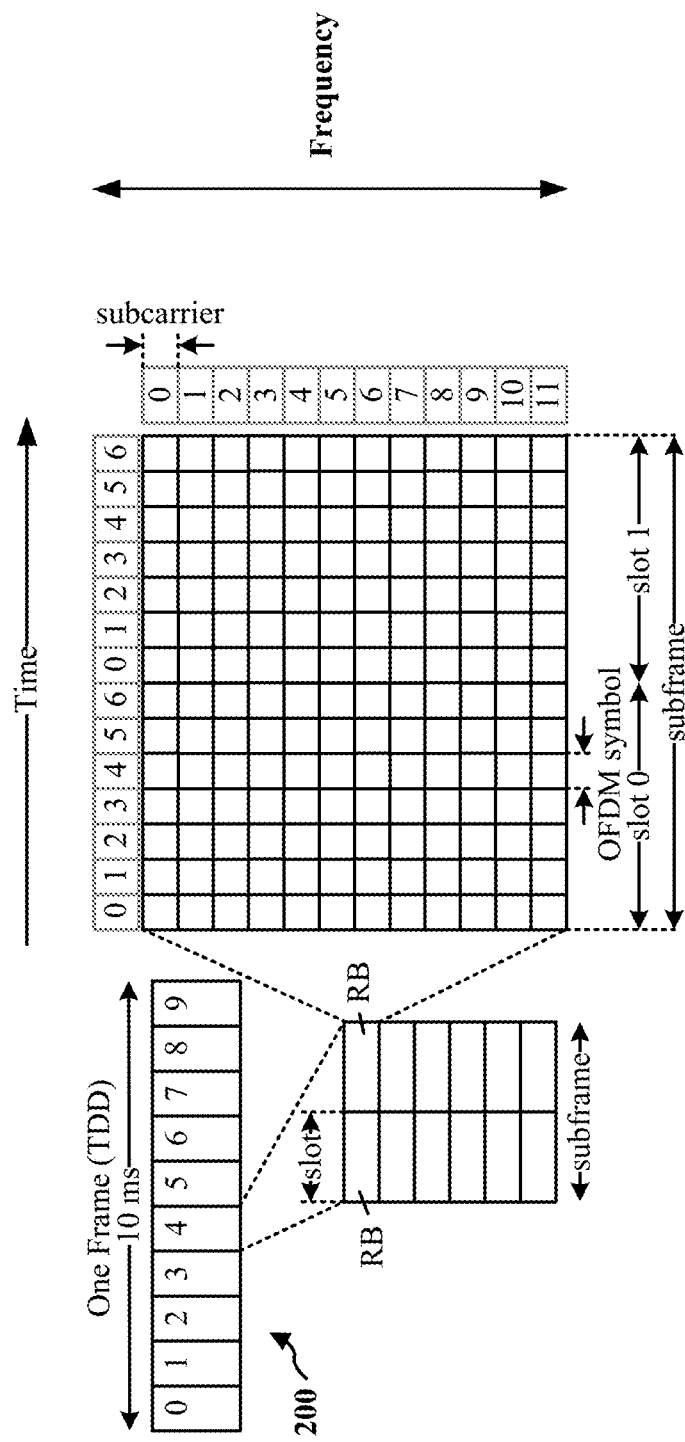
FIG. 2 illustrates an example frame structure.

FIG. 2 is a diagram 200 illustrating an example frame structure, e.g., that may be used within a 5G/NR frame structure. The frame structure may define resources in time and frequency for wireless communication. The frame structure may be for uplink or downlink subframes. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the example illustrated in FIG. 2, the frame structure is TDD, with DL subframes and/or UL subframes. Any particular subframe may be split into different subsets that provide both UL and DL. Note that the description infra applies also to a 5G/NR frame structure that is FDD.

Other wireless communication technologies may have a different frame structure and/or different channels. A frame (e.g., 10 ms) may be divided into equally sized subframes, such as 10 equally sized subframes (1 ms). Each subframe may include one or more time slots. Each slot may include a defined number of symbols, e.g., 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration may be a function of the numerology. The subcarrier spacing may be equal to $2^\mu * 15$ kKz, where $\mu$ is the numerology 0-5. The symbol length/duration is inversely related to the subcarrier spacing. One example of subcarrier spacing is 15 kHz, and one example of symbol duration is approximately 66.7 µs.

A resource grid may be used to represent the frame structure. Each time slot may include a resource block (RB) (also referred to as physical RBs (PRBs)) that extends for a certain number of consecutive subcarriers. In FIG. 2, 12 consecutive subcarriers are illustrated. The resource grid may be divided into multiple resource elements (REs). The number of bits carried by each RE may depend on the modulation scheme.

Some of the REs may carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

Various channels may be comprised within a DL subframe of a frame. Examples of possible channels may include a physical control format indicator channel (PCFICH) that carries a control format indicator (CFI) that indicates which symbols the physical downlink control channel (PDCCH) occupies, a PDCCH carrying downlink control information (DCI) within one or more control channel elements (CCEs), each CCE including nine RE groups (REGs), each REG including four consecutive REs in an OFDM symbol, a UE-specific enhanced PDCCH (ePDCCH) that also carries DCI, a physical hybrid automatic repeat request (ARQ) (HARQ) indicator channel (PHICH) that carries the HARQ indicator (HI) that indicates HARQ acknowledgement (ACK)/negative ACK (NACK) feedback based on the physical uplink shared channel (PUSCH), and a primary synchronization channel (PSCH). The PSCH may carry a primary synchronization signal (PSS) that is used by a UE 104 to determine subframe/symbol timing and a physical layer identity. A secondary synchronization channel (SSCH) be included in the frame, e.g., carrying a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. A physical broadcast channel (PBCH), which carries a master information block (MIB), may be logically grouped with the PSCH and SSCH to form a synchronization signal (SS)/PBCH block. The MIB provides a number of RBs in the DL system bandwidth, a PHICH configuration, and a system frame number (SFN). A physical downlink shared channel (PDSCH) may carry user data, broadcast system information not transmitted through the PBCH such as system information blocks (SIBs), and paging messages.

Some of the REs may carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

Example uplink channels include a physical random access channel (PRACH) that allows the UE to perform initial system access and achieve UL synchronization, and a physical uplink control channel (PUCCH) that carriers uplink control information (UCI), such as scheduling requests, a channel quality indicator (CQI), a precoding matrix indicator (PMI), a rank indicator (RI), and HARQ ACK/NACK feedback. The PUSCH may carry data, and may additionally be used to carry a buffer status report (BSR), a power headroom report (PHR), and/or UCI.

Figure 3:
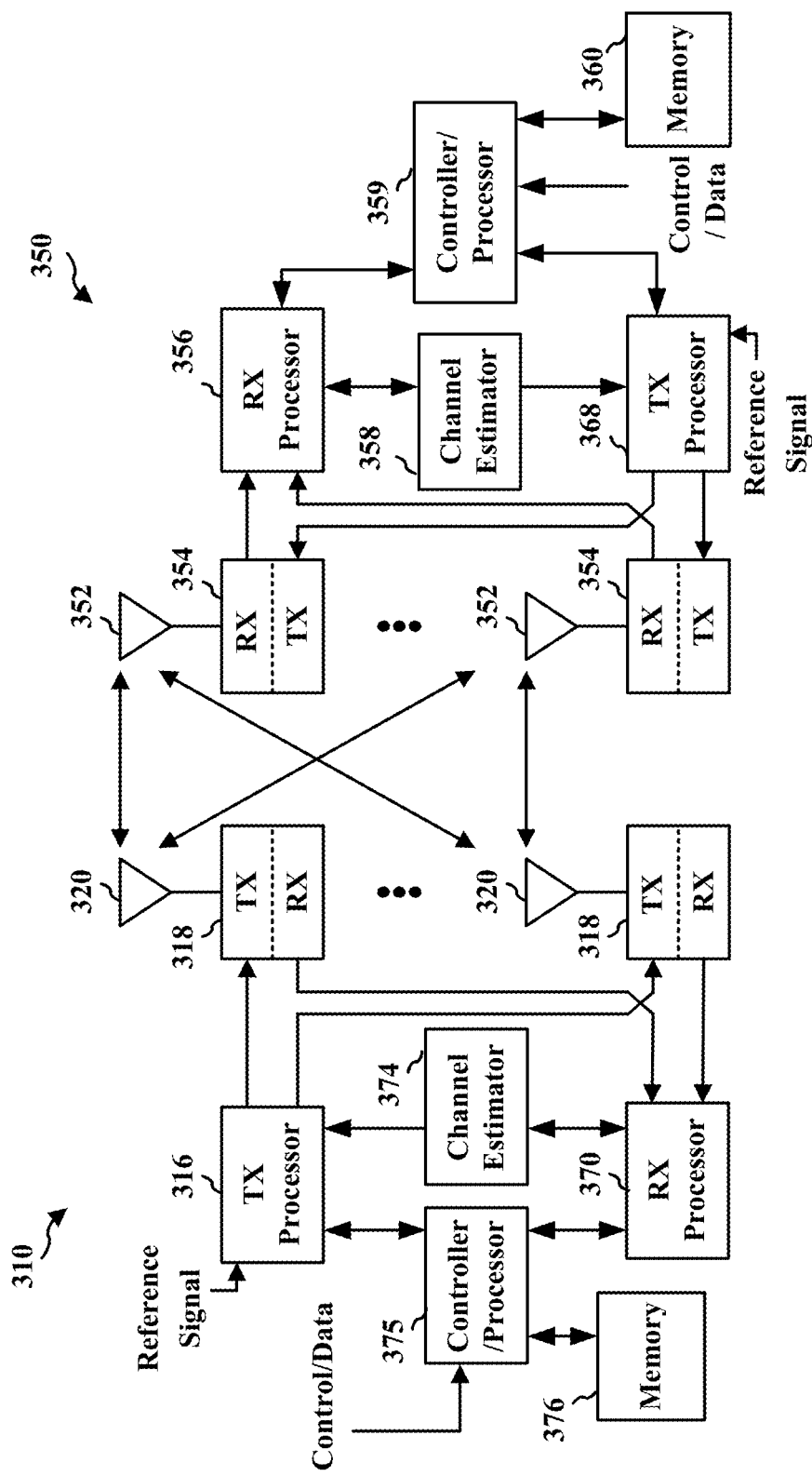
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In Cellular Internet of Things (CIoT) small amounts of data may need to be transferred via a core network to a User Equipment (UE). This may include infrequent small data transfers and/or frequent small data transfers. A significant amount of overhead may be required in order to communicate small user data between a user equipment and an Application Function (AF), for example. Small amounts of user data may be transmitted in a periodic or infrequent manner. Such data may comprise user data in contrast to control information or control measurements at a UE. Small user data may comprise, e.g., a data stream having relatively infrequent and/or short lived sporadic burst transmissions of data for which the overhead requirements of a conventional link set up protocol would be large relative to the amount of data to be conveyed. In one example, small data may have a size below 100 bytes and/or may have a data rate below 100 kbps. In one example, the small data may comprise information from collected at a sensor, e.g., an electricity meter or a water meter may monitor and report data about electricity usage or water usage. The meters may periodically transmit small amounts of data to a network, e.g., reporting the monitored electrical or water information. As one example, a sensor may transmit measurement data in an infrequent or periodic manner. Small data may comprise data that meets a size threshold, such as being below a size threshold. In one example, the size threshold may be, e.g., 64 octet. Thus, data that is less than 64 octet may be carried over the control plane, as presented herein, in a manner that reduces the overhead burden to communicate the data. In another example, as described above, a threshold for small data may comprise 100 bytes and/or a data rate of 100 kbps. In this example, small data having a size below 100 bytes and/or having a data rate below 100 kbps may be carried over the control plane. If the data is larger than the size threshold for small data, e.g., the data may be communicated in another manner, e.g., using the normal signaling overhead. The examples of 64 octet, 100 bytes, and/or 100 kbps are merely examples of a size threshold for small data. The size threshold for data to be transported as small data over the control plane may also be set at a different size.

Small data may be transported to the UE via a control plane or via a user plane of the core network. The data may be processed at a Session Management Function (SMF) for transport with a low overhead as a session management payload over an NAS protocol. Connection set up requirements for the UE and RAN in order to communicate such small data to the UE may be reduced by transporting the data over the control plane as a Session Management (SM) payload from a Small Data Capable Session Management Function (SDC-SMF) or over the user plane from a Small Data Capable User Plane Function (SDC-UPF) or UE, e.g., as a payload in an RRC message.

At a core network, data ingress for NIDD may use a T8 reference point. The SDC-SMF may terminate a T8 interface by which an AF introduces data into the core network, e.g., as illustrated in the examples in FIGS. 5 and 10. The SDC-SMF may be configured to store and forward small data towards a UE. For example, the SDC-SMF may be configured to buffer small data while a UE is in an idle mode and to forward the small data toward the UE when the UE is awake. An idle mode may include when the UE is in an RRC idle mode, a Connected Mode (CM) idle, etc. The UE may be considered to be in an awake mode, e.g., when the UE is in an RRC connected mode, CM connected mode, etc. For example, the UE may be considered to be in an awake mode when the AMF does not need to page UE to communicate with the UE. The SDC-SMF may enable the SMF to manage Quality of Service (QoS) for a small data stream, perform IP header compression for data IP streams, encrypt data with SMF specific encryption keys, and/or protect the integrity of the data with SMF specific integrity-protection keys shared keys between the UE and the SMF.

It is desirable for UEs to be quickly released from connection with the network, e.g., from an RRC connection, when no additional Mobile Originated (MO) data is present at the UE and/or when no additional Mobile Terminated (MT) data is destined for the UE. By releasing the UE more quickly, the UE may save power by transitioning into an idle mode or a sleep mode in a more efficient manner.

Aspects presented herein provide for a quicker release of a UE. The release may be based on an indication sent to the network, e.g., to a RAN, over the control plane or the user plane from either a UE, an AF, or a UPF. Thus, aspects include a UE initiated/requested RAN connection release that may be performed when the UE has sufficient information to determine that there is no more MO/MT data for the UE. In other aspects, a network driven RAN connection release can be performed when an Application Server (AS) or an AF determines that there is no more MO/MT data for the UE. The indication regarding the end of data may be sent by either the UE or by the AF and may be sent over the control plane or the user plane.

In one example, the fast release may comprise an NAS based connection release, e.g., as described in connection with FIGS. 4-9. For example, a UE may send Release Assistance Information (RAI) Information Element (IE) to the MME to indicate that no additional MO/MT traffic is expected. In another example, the UE may send RAI to the SMF to request release of a PDU session.

In another example, the fast release may comprise a RAN based solution, e.g., as described in connection with FIGS. 10-16. For example, an RRC release may be driven by an indication of release assistance information to a RAN node from a UE and/or a UPF. The indication may be sent over the user plane or as RRC signaling.

NAS Based Release Procedure

Figure 4:
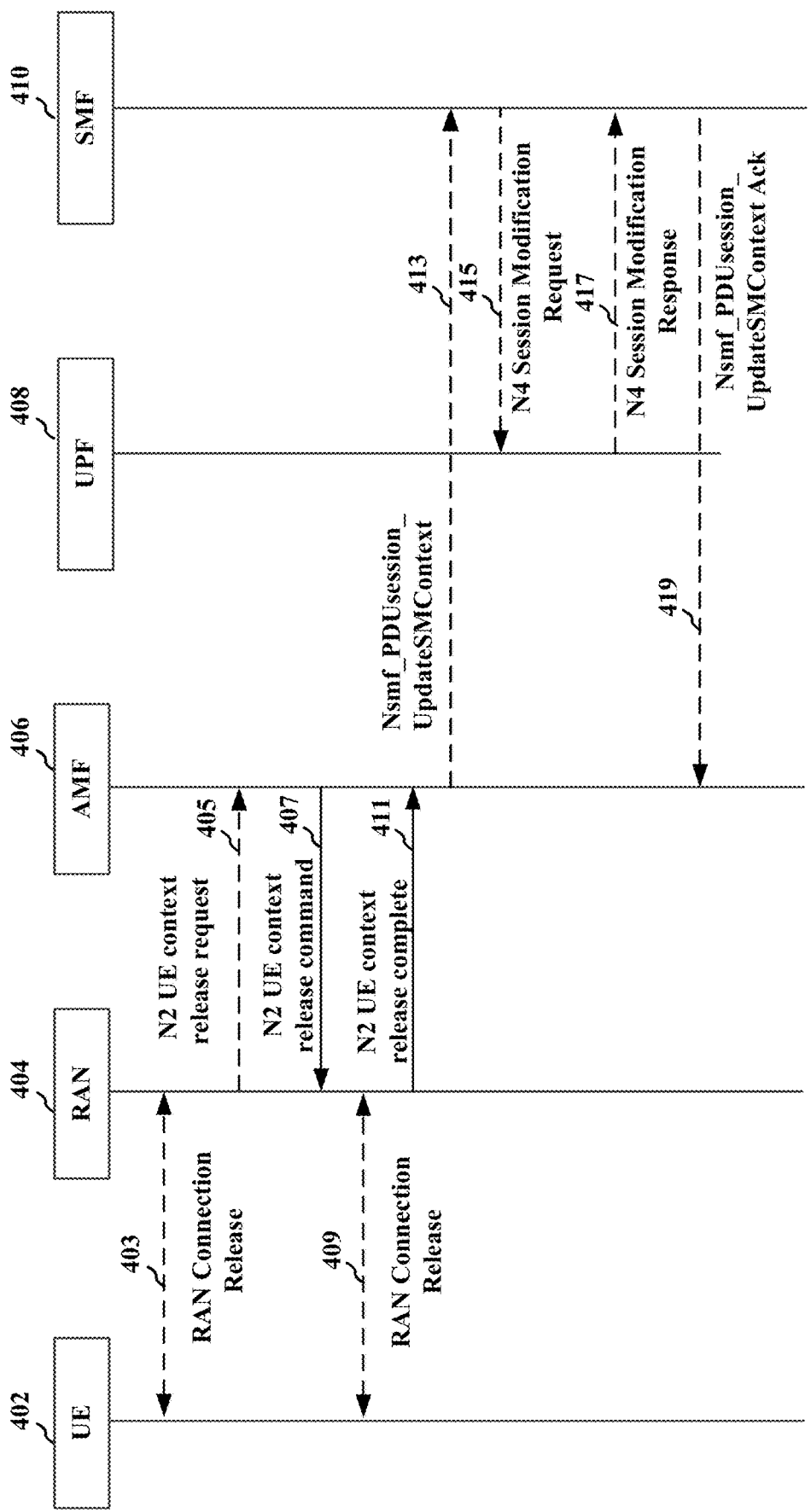
FIG. 4 illustrates an example NAS connection release procedure.

FIG. 4 illustrates an example of NAS connection release that is initiated by the RAN node or by the AMF. This procedure may be used to release the logical Next Generation Application Protocol (NG-AP) signalling connection and the associated N3 User Plane connections, and RAN RRC signalling and resources. In this example, the initiation of the AN release may be either RAN-initiated or AMF initiated. For example, the RAN may initiate the release with cause, e.g. Operations and Management (O&M) Intervention, unspecified Failure, radio link failure (RLF), user inactivity, inter-system redirection, release due to UE generated signaling connection release, mobility restriction, etc. The AMF may initiate the release with cause e.g. unspecified failure, etc.

At 403 in FIG. 4, a RAN connection release may be communicated between the UE 402 and RAN 404, as optionally indicated with a dashed line. For example, if there is some confirmed RAN conditions (e.g. Radio Link Failure) or for other RAN internal reason, the RAN may decide to initiate the UE context release in the RAN. In this case, the RAN sends, at 405, an N2 UE Context Release Request message comprising an indication of a Cause and a List of PDU Session ID(s) with active N3 user plane to the AMF 406. Cause indicates the reason for the release, and the List of PDU Session ID(s) indicates the PDU Sessions served by RAN of the UE.

If the AMF receives the N2 UE Context Release Request message or due to an internal AMF event, including the reception of Service Request or Registration Request to establish another NAS signaling connection still via NG-RAN, the AMF sends, at 407, an N2 UE Context Release Command to the RAN, which may comprise a Cause. The Cause indicates either the Cause from RAN in 405 or the Cause due to an AMF internal event.

If the AMF receives Service Request or Registration Request to establish another NAS signaling connection still via NG-RAN, after successfully authenticating the UE, the AMF releases the old NAS signaling connection, and then continues the Service Request or Registration Request procedure. At 409, the RAN requests the UE to release the RAN connection, e.g., by sending a RAN connection release to the UE. Upon receiving a RAN connection release confirmation from the UE, the RAN deletes the UE's context.

At 411, the RAN confirms the N2 Release by returning an N2 UE Context Release Complete message comprising a List of PDU Session ID(s) with active N3 user plane to the AMF. The List of PDU Session ID(s) indicates the PDU Sessions served by RAN of the UE. The N2 signaling connection between the AMF and the RAN for that UE is released. The RAN provides the list of recommended cells/TAs/NG-RAN node identifiers for paging to the AMF.

For each of the PDU Sessions in the N2 UE Context Release Complete, the AMF may send, at 413, an update to the SMF 410, e.g., Nsmf_PDUSession_UpdateSMContext comprising a PDU Session ID, PDU Session Deactivation, and Cause.

At 415, the SMF may send an N4 Session Modification Request to the UPF 408. The SMF initiates an N4 Session Modification procedure indicating the need to remove Tunnel Info of AN or UPF terminating N3. Buffering on/off indicates whether the UPF shall buffer incoming DL PDU or not. At 417, the UPF may respond to the SMF with an N4 Session Modification Response acknowledging the SMF request. At 419, the SMF may send an update acknowledgement to the AMF 406, e.g., Nsmf_PDUSession_UpdateSMContext Ack to AMF 406, e.g., in response to the message at 413.

Upon completion of the procedure, the AMF considers the N2 and N3 as released and enters CM-IDLE state.

In one example, the fast release may comprise an NAS based connection release. For example, a UE may request a release of a PDU session by sending an RAI IE to the MME to indicate that no additional MO/MT traffic is expected. The UE may send a request to release a PDU session by sending a NAS ESM message with a RAI IE. The MME may then initiate a release of 51. Subsequently, the RAN may initiate RLC.

Figure 5:
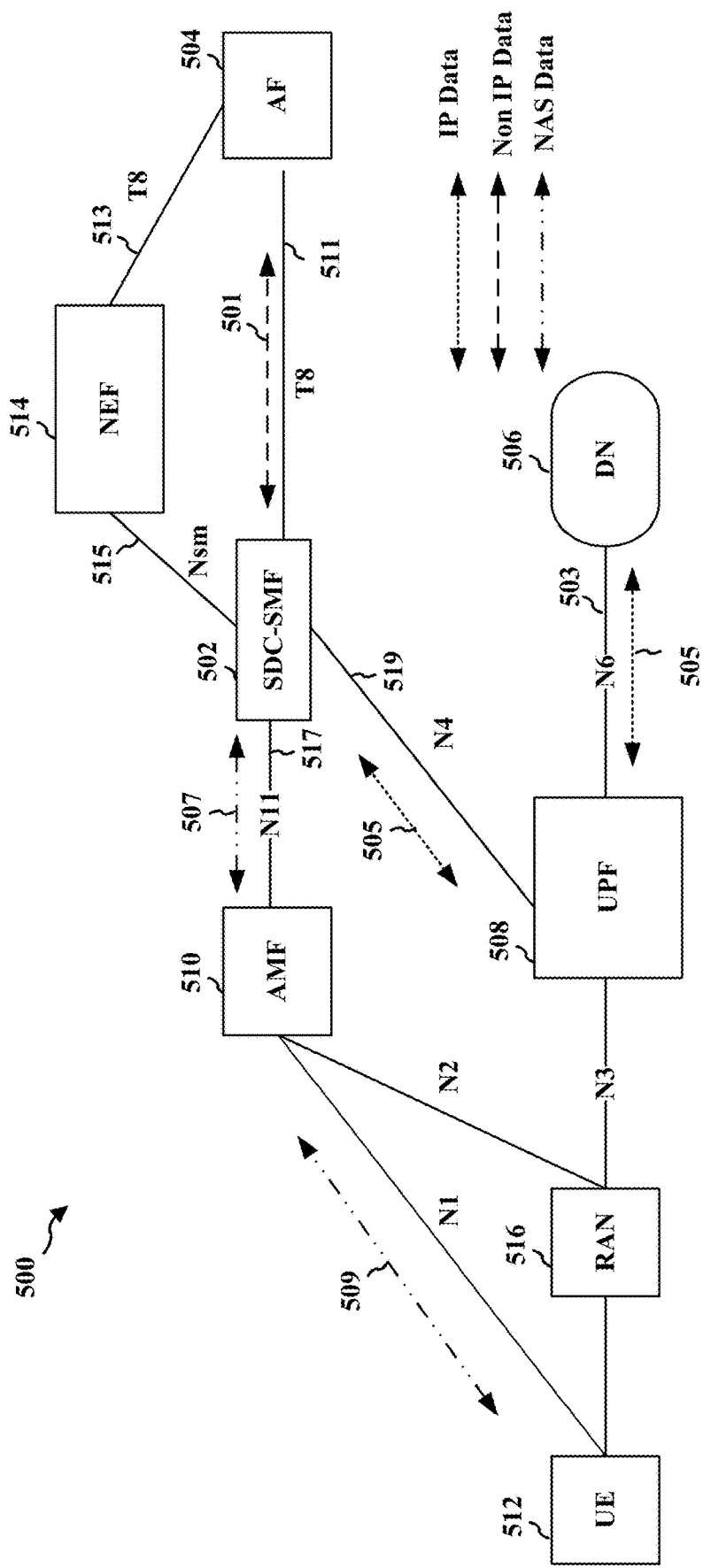
FIG. 5 illustrates an example network architecture for data delivery over a control plane.

User data communicated over a control plane, e.g., NAS, may comprise NIDD or IP data. FIG. 5 illustrates an example network architecture for the delivery of NIDD and IP communication over a control plane, e.g., via an SMF 502. As presented herein, the UE may provide an RAI IE to Session Management (SM) messages that may enable the UE to request a quicker release from the network. Aspects may also include the NAS signaling connection release, e.g., including any of 405-411 described in connection with FIG. 4.

FIG. 5 illustrates an example network architecture 500 having a data delivery path over a control plane. The network architecture 500 may comprise a 5G NR network having a control plane and a user plane. As illustrated in FIG. 5, Mobile Terminated (MT) NIDD data 501 enters the core network, e.g., from an AF 504 external to the network, through a T8 interface 511 that terminates at the SDC-SMF 502. As illustrated in FIG. 5, the Network Exposure Function (NEF) 514 may also terminate a T8 interface 513 from the AF 504 and may have an interface, e.g., an Nsm interface 515, to the SDC-SMF. Thus, SDC-SMF provides an ingress point for data 501 from the AF. Although only a single AF 504 is illustrated, any number of AFs may transport data to various user equipment via the core network. Mobile Terminated (MT) IP Data Delivery (IPDD) 503 may enter the core network via a Data Network (DN) 506, e.g., via an N6 interface 503. The User Plane Function (UPF) 508 that receives the IPDD 505 may forward the data 505 to the SDC-SMF 502, e.g., via an N4 interface 519. Thus, the SDC-SMF 502 may receive data from the AF 504 or the DN 506 and may process the data for transport to the UE 512. IP compression, e.g., IP header compression, may be performed at the SDC-SMF 502. The data 501, 505 may be placed in an NAS SM message payload 507 and sent to the AMF 510 via interface 517. The data may comprise NIDD 501 coming into the core network from an AF 504 or the data is IP Data 503 coming into the core network from a DN 506. The data 509 may then be forwarded, e.g., in a NAS message, to the UE 512 from the Core Access and Mobility Management Function (AMF) 510. As well, an interface is illustrated between the UPF 508 and the UE 512 and a RAN 516. The SDC-SMF may also protect the integrity of the data with SMF specific integrity-protection keys. The SMF specific encryption and/or integrity protection keys may be the shared keys between the UE and the SMF. Although this example has been described for data received from an AF or DN and transmitted to a UE, the SDC-SMF may similarly receive small data from UE 512, e.g., as a SM payload. The SDC-SMF 502 may process the SM payload to obtain the data and to provide the data to the AF 504 of the DN 506. In this example, the SDC-SMF may perform IP header decompression. The handling of small data by an SDC-SMF has a number of advantages. For example, SMF functions, such as control rate, can be leveraged for Control Plane (CP) data. Additionally, AMF functionality is largely unmodified. For example, the AMF 510 simply forwards data payload frames to the SMF. The processing of the data may be performed by the SMF 502. This may provide an easier transition between IP data over the control plane to user plane data.

UE Requested Release for NIDD Data Over a Control Plane

Figure 6:
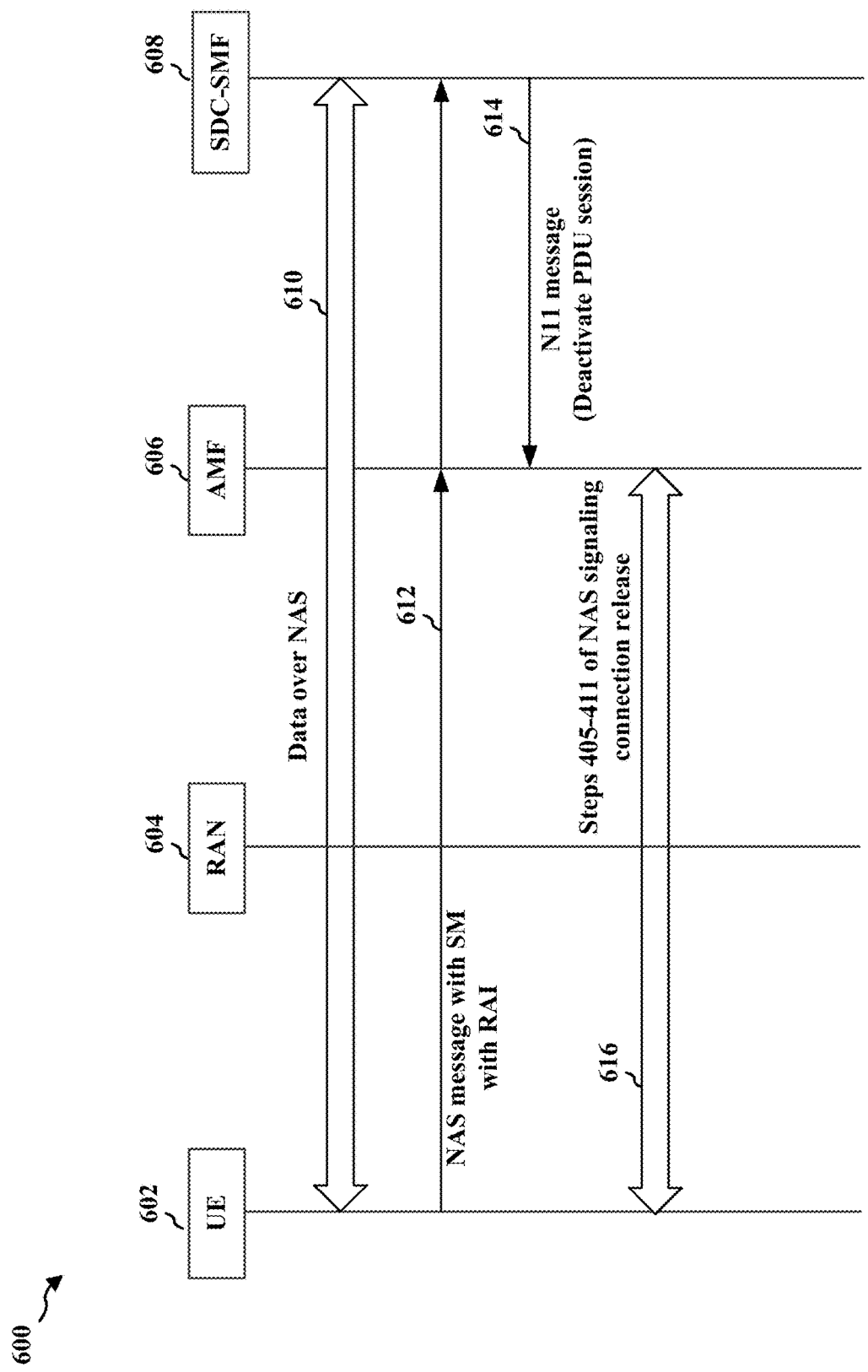
FIG. 6 illustrates example aspects of a UE initiated release procedure for Non-IP Data Delivery (NIDD) data over a control plane.

FIG. 6 illustrates an example communication flow 600 for a UE requested release procedure for NIDD data that is communicated over a control plane, as described in connection with FIG. 5. In FIG. 6, the UE and network exchange data over NAS at 610, e.g., UE 602 (e.g., UE 512) and SDC-SMF 608 (e.g., SDC-SMF 502) exchange data as NAS messages comprising an SM payload carrying the data. At 612, the UE may send an NAS message with an SM payload comprising an added RAI IE, e.g., added to a last MO data or to an ACK payload when there is no MT data expected by the UE. In response, the SMF may send an N11 message 614 to MF 606 to deactivate the PDU session. This indication may be forwarded to the RAN node 604 (e.g., 516). If the RAN node 604 determines that there are no more active PDU sessions with the UE, at 616, the aspects of the NAS connection release described in steps 405-411 of FIG. 4 may be initiated by the RAN node for NIDD data over the control plane.

While this example is described for communication between a UE and a single AF, the UE may communicate with a plurality of AFs at any given time. Thus, the RAN tracks how many sessions are associated with the UE and which sessions are active/inactive. The information provided from the SMF may only indicate that a single session with a single AF is finished. When the UE has other active sessions with other AFs, the RAN refrains from releasing the UE until there are no longer any active sessions.

UE Requested Release for IP Data Over a Control Plane

Figure 7:
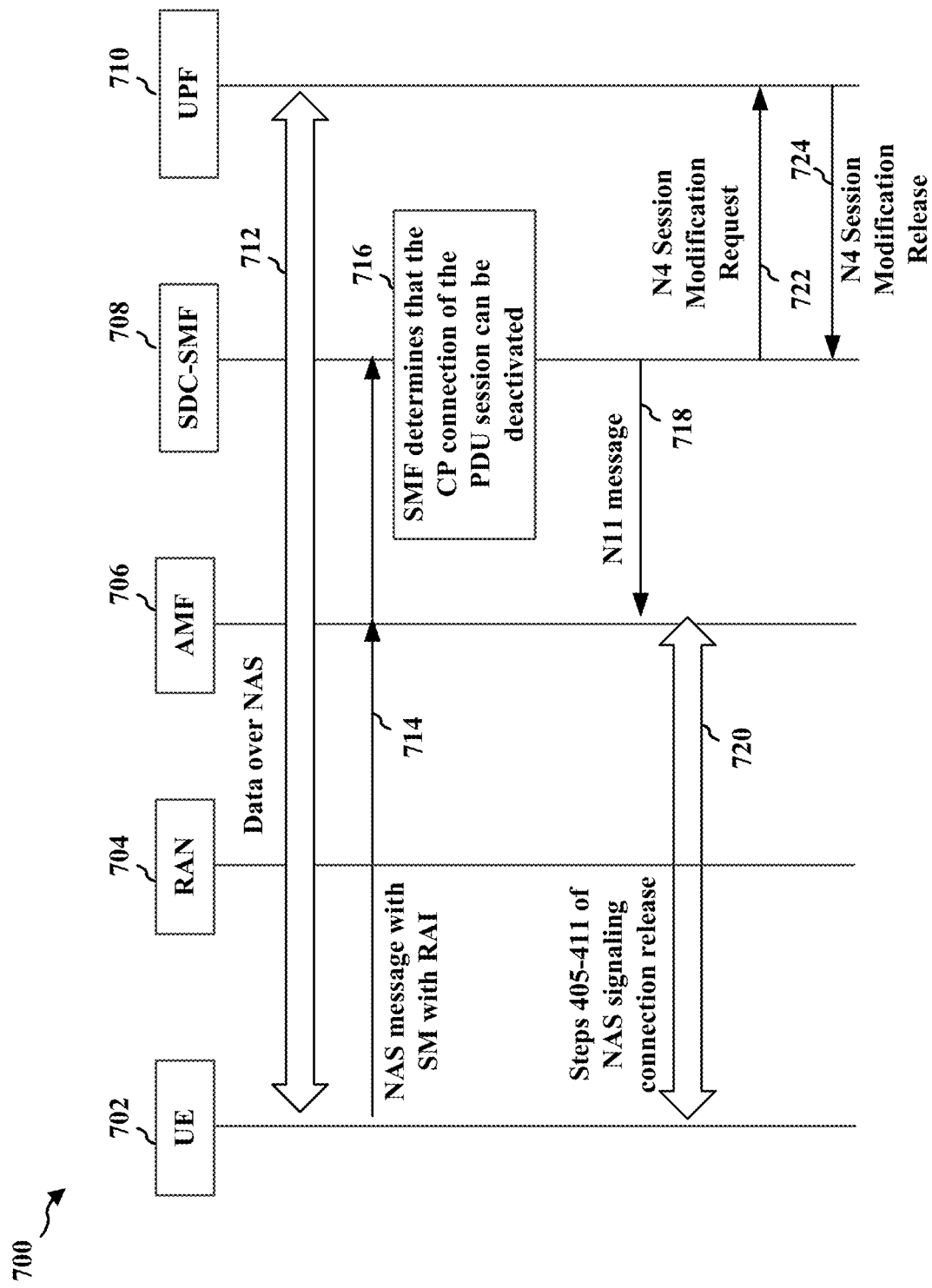
FIG. 7 illustrates example aspects of a UE initiated release procedure for Internet Protocol (IP) data over a control plane.

FIG. 7 illustrates an example communication flow 700 for a UE requested release procedure for IP data over a control plane. In FIG. 7, the UE and network exchange data over NAS at 712, e.g., UE 702 (e.g., UE 512) and UPF 710 (e.g., 508) exchange data as NAS messages comprising an SM payload carrying the data. At 714, the UE may send an NAS message to the SDC-SMF 708 (e.g., 502) with an SM payload comprising an added RAI IE, e.g., added to a last MO data or to an ACK payload when there is no MT data expected by the UE. At 716, the SMF may determine that the control plane connection of the PDU session can be deactivated. At 718, the SMF sends an N11 message with a deactivate PDU session indication to the AMF 706, which is forwarded to the RAN 704. RAN 704 may comprise an NG-RAN. If the RAN node 704 determines that there are no more active PDU sessions with the UE, at 720, the aspects of the NAS connection release described in steps 405-411 of FIG. 4 may be initiated by the RAN node (e.g., 516) for IP data over the control plane. At 722, the SMF may send a session modification request to the UPF 710. At 724, the UPF may respond with an N4 session modification response.

In another example, the UE may send RAI to the SMF to request release of a PDU session.

Application Server Assisted Connection Release

In certain examples, the AF may have knowledge that a data session is complete rather than the UE being aware. Thus, in an example, the AF (e.g., 504) may provide the indication to the network to initiate the release of the UE. For example, the AF may provide an indication via T8 to the NEF (514) for the core network to release the control plane/user plane connection with the UE 712 after the data session/interaction is complete. This indication from the AF 704 may trigger the NEF 714 to indicate a release to the SMF 702 (e.g., 502), as described in connection with the examples of FIGS. 8 and 9.

AF Initiated Release for NIDD Data Over the Control Plane

Figure 8:
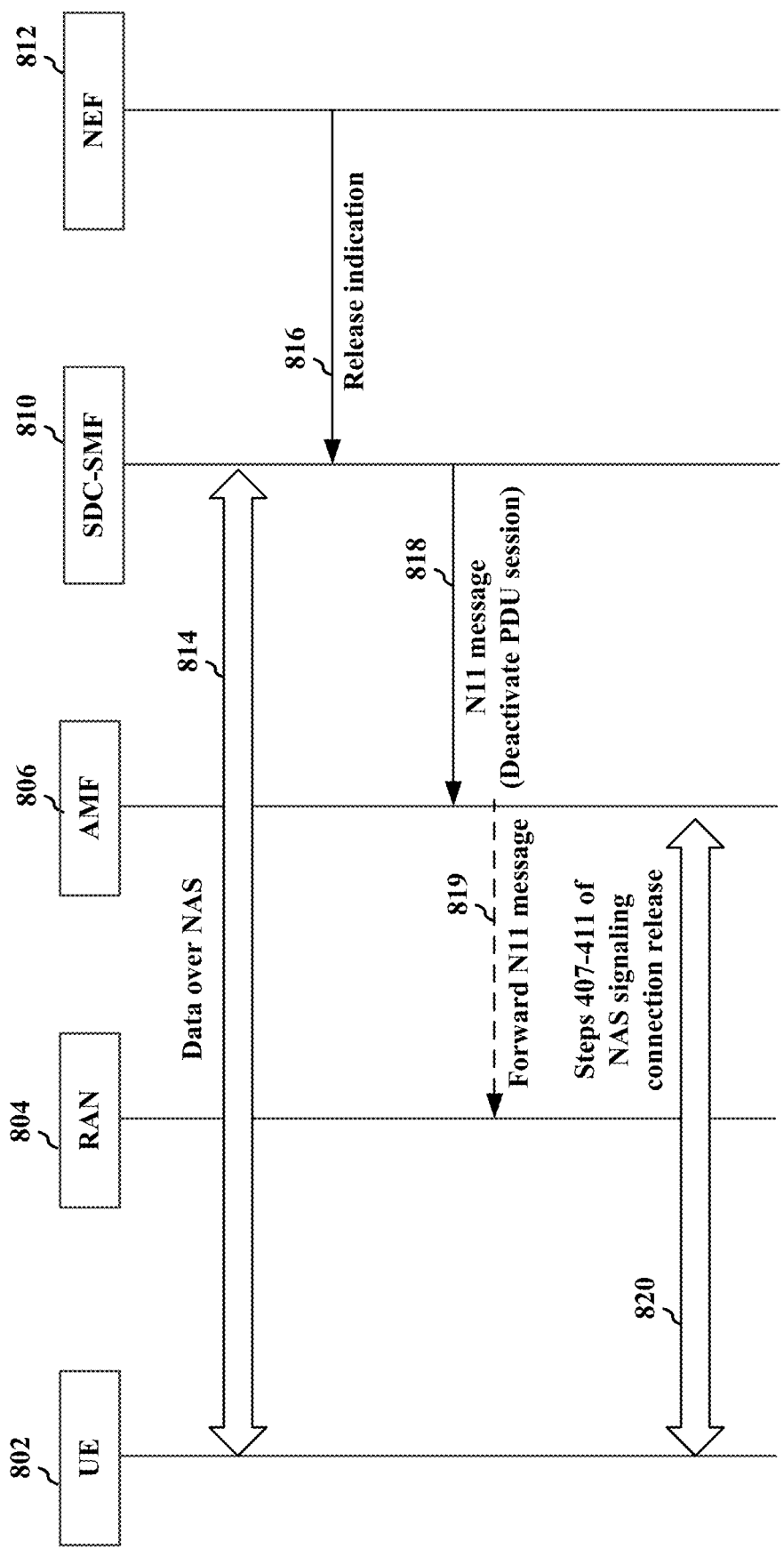
FIG. 8 illustrates example aspects of an Application Function (AF) initiated release procedure for NIDD data over a control plane.

FIG. 8 illustrates an example communication flow 800 for AF initiated release procedure for NIDD data communicated over the control plane. At 814, data is communicated between the UE 802 (e.g., 512) and the SDC-SMF 810 (502) over NAS. In FIG. 8, NEF 812 (e.g., 514) sends a message to SDC-SMF 810 with a release indication 816 that there is no additional data to be sent to the UE 802. The SMF 810 then sends a message 818 to AMF 806 (e.g., 510), e.g., an N11 message with an indication to deactivate the PDU session with the UE 802. The message 818 may then be forwarded to the RAN (e.g., 516), e.g., at 819. If the RAN node 804 determines that there are no more active PDU sessions with the UE 802, at 820, the aspects of the NAS connection release described in steps 407-411 of FIG. 4 may be initiated by the RAN node for NIDD data over the control plane.

AF Initiated Release for IP Data Over the Control Plane

Figure 9:
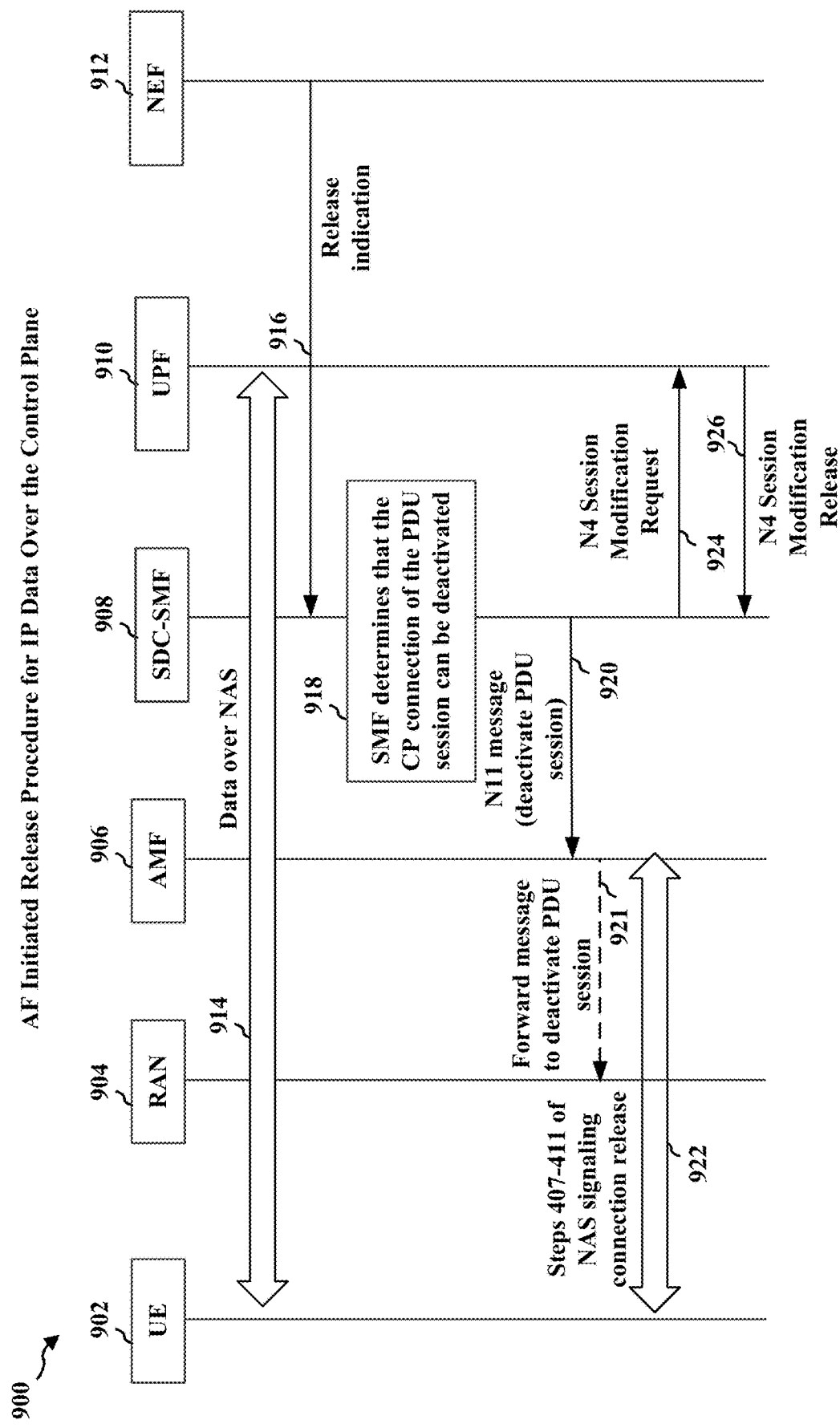
FIG. 9 illustrates example aspects of an AF initiated release procedure for IP data over a control plane.

FIG. 9 illustrates an example communication flow 900 AF initiated release procedure for IP data over a control plane, e.g., communicated over NAS between UPF 910 (e.g., 508) and UE 902 (e.g., 512). UPF 910 may comprise an SDC-UPF. Initially data 914 may be communicated between UE 902 and the network, e.g., UPF 910 An AF (e.g., 504) may send a release indication or other trigger, not shown in FIG. 9, to NEF 912 via a T8 interface, e.g., such as T8 illustrated in FIG. 5. Upon receiving the release indication or trigger from the AF, the NEF 912 sends a release indication 916 to SDC-SMF 908. The release indication 916 may comprise an RAI sent to the SMF.

At 918, the SMF 908 determines that the control plane connection for the PDU session with the UE can be deactivated. After making the determination, the SDC-SMF sends a message 920 to the AMF 906 indicating to deactivate the PDU session, e.g., an N11 message to deactivate the PDU session. The indication 920 to deactivate the PDU session from the SMF is then forwarded to the RAN 904 at 921. RAN 904 may comprise an NG-RAN. If the RAN 904 node determines that there are no more active PDU sessions with the UE 902, at 922, the aspects of the NAS connection release described in steps 407-411 of FIG. 4 may be initiated by the RAN node for IP data over the control plane. The SMF 908 may send a session modification request 924 to UPF 910, e.g., an N4 session modification request. The UPF 910 may respond with an N4 session modification response 926.

RAN Based Release Procedure

Figure 10:
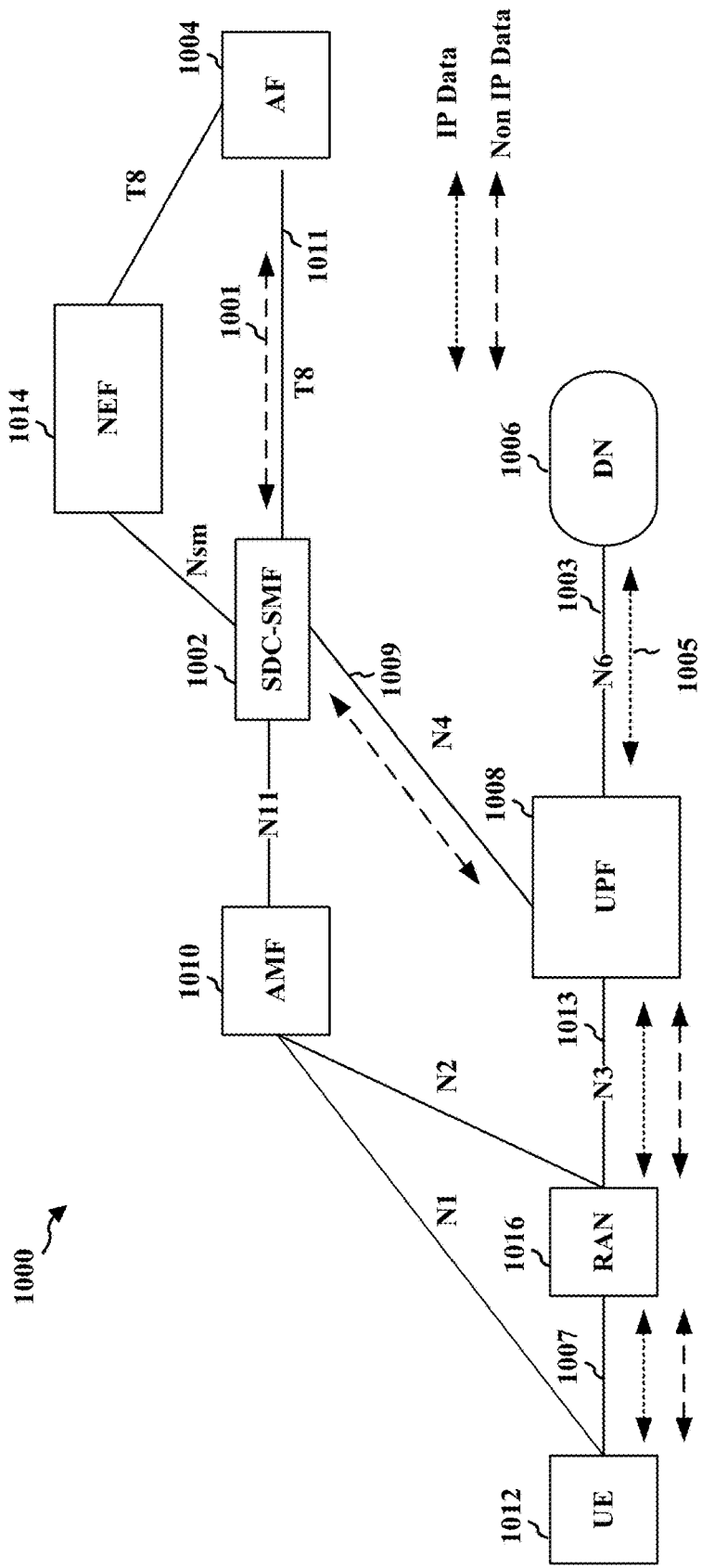
FIG. 10 illustrates an example network architecture for data delivery through an Small Data Capable User Plane Function (SDC-UPF).

FIG. 10 illustrates an example network architecture 1000 having a data delivery path that comprises an UPF 1008 and that enables user data delivery between a network and a UE over a user plane. The UPF 1008 may comprise an SDC-UPF. In one example, the network architecture 1000 may comprise, e.g., a 5G NR network, having a control plane and a user plane. As illustrated in FIG. 10, Mobile Terminated (MT) NIDD data 1001 may enter the core network, e.g., from an AF 1004 external to the network, through a T8 interface 1011 that terminates at the SDC-SMF 1002 and is then forwarded to UPF 1008, e.g., via an N4 interface 1009. Thus, SDC-SMF provides an ingress point for user data from the AF 1004 for transmission to the UE 1012. Although only a single AF 1004 is illustrated, any number of AFs may transport data to various UEs 1012 via the core network. The data may then be forwarded from the SDC-SMF 1002 to the UPF 1008 for transfer to the UE 1012 over the user plane. The data may be forwarded, e.g., via an N4 interface to the UPF 1008.

MT IP Data Delivery (IPDD) 1005 may also enter the core network via a Data Network (DN) 1006, e.g., via an N6 interface 1003. The UPF 1002 that receives the IP data or Non-IP data may process the data for low overhead transport to the UE 1012 without bearer set up protocol. The UPF 1002 may forward the processed data to the RAN 1016, e.g., via an enhanced N3 interface 1013. The processed data, whether received from AF 1004 or DN 1006, may be transported from the SDC-UPF 1008 to the UE 1012, e.g., as an RRC payload. The RRC payload may be transmitted from RAN 1016 to the UE 1012, e.g., via connection 1007. IP compression, e.g., IP header compression, may be performed at the SDC-UPF 1002. FIG. 10 also illustrates interfaces with the Core AMF 1010, NEF1014, and the SDC-SFM 1008. Although this example has been described for data received from an AF or DN and transmitted to a UE, the SDC-UPF may similarly receive small data from UE 1012, e.g., as an RRC payload. Thus, the communication flow may include both uplink and downlink small data transmissions. The SDC-UPF 1008 may process the RRC payload to obtain the data and to prove the data to the AF 1004 of the DN 1006. In this example, the SDC-UPF 1008 may perform IP header decompression.

The network architecture of FIG. 10 provides a number of benefits. The architecture enables UPF functions, such as rate control, to be leveraged for CIoT data delivery. As well, this architecture enables data delivery without requiring control plane transmissions. The delivery of user data to the UE using an SDC-UPF also avoids overloading the control plane associated with small data delivery.

Aspects presented herein enable assistance information from a UE or an SDC-UPF to enable a faster release of the UE. UE power consumption can be beneficially reduced by improving the speed with which the UE is released after a small data transmission. In this example, the SMF may not be involved in determining whether to release the UE. Instead, the SDC-UPF may send an indication to the RAN to initiate release of the UE.

UE Indicated Release

Figure 11:
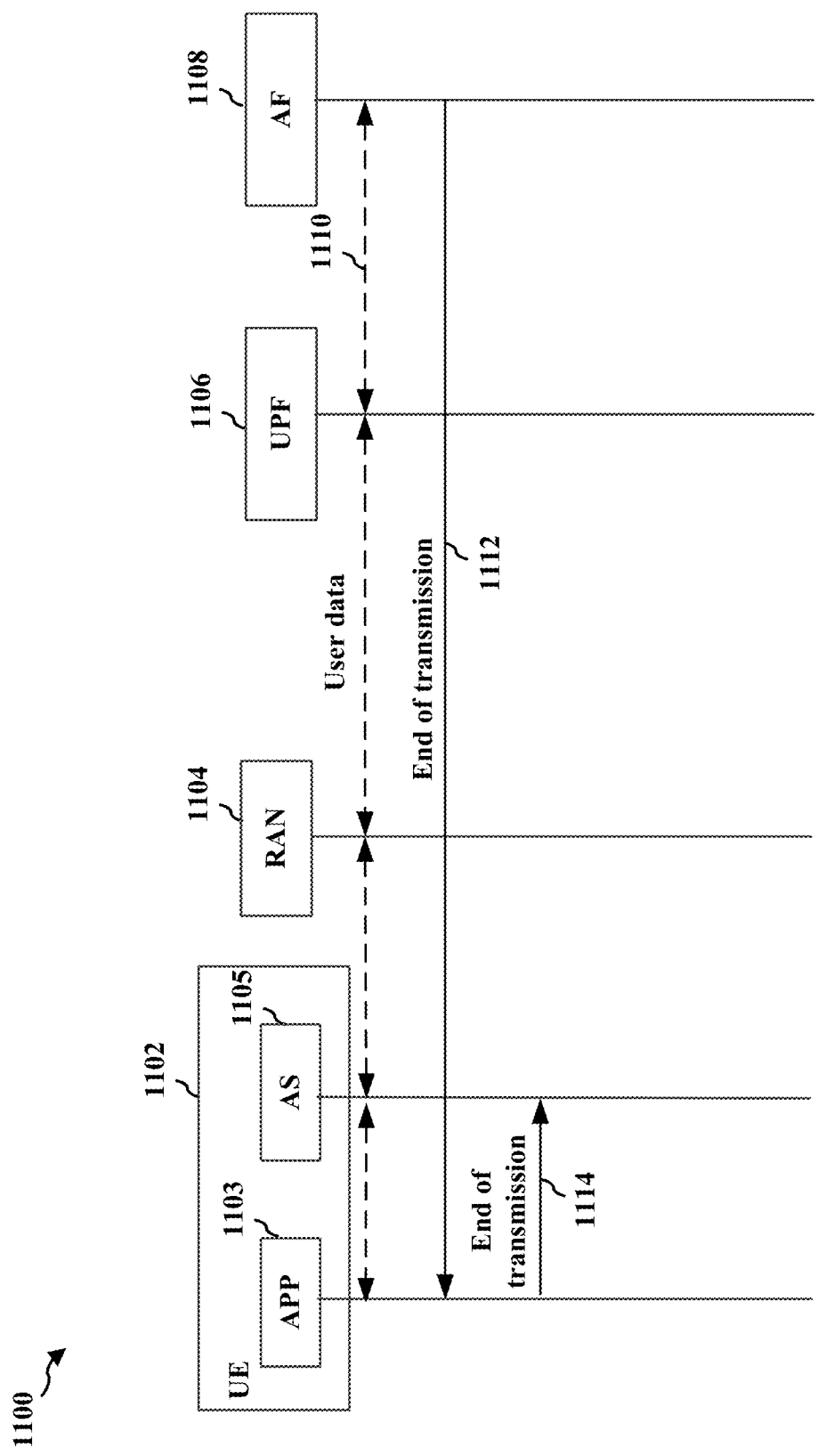
FIG. 11 illustrates example aspects of a UE initiated release over a user plane.

FIG. 11 illustrates aspects of an example 1100 in which a UE 1102 (e.g., UE 1012) may have information to initiate the release by sending release assistance information, e.g., RAI, to the RAN 1104 (e.g., RAN 1016). In FIG. 11, the UE 1102 communicates user data at 1110 over the user plane with AF 1108 (e.g., 1004). The user data may be forwarded between the AF and the UE via UPF 1106 (e.g., SDC-UPF 1002) and RAN 1104 (e.g., RAN 1016), as described in connection with FIG. 10.

When there is no additional data to transmit, the UE application layer 1103 may indicate an end of the transmission 1114 to an AS layer 1105. The data to transmit can refer to uplink data. This can be regarded as the extension of BSR, e.g., with the MAC layer notifying the RAN about the UL data available for transmission. In FIG. 11, the APP layer at the UE 1103 informs the AS layer 1105 about the end of the uplink data transmission.

The data to transmit can also refer to both uplink and downlink. The indication regarding the end of the transmission 1114 may be sent by the UE 1102 when the UE is not expecting to receive additional data from the AF. For example, the UE may receive an end of transmission indication 1112 from AF 1108 to APP layer 1103 regarding the end of a transmission. The APP layer 1103 of the UE 1102 may then notify the AS layer 1105 about the release information.

The indication of the end of transmission 1114 may comprise a buffer status report, and therefore may indicate that there is no more data to send and no additional data expected from the AF.

Figure 12:
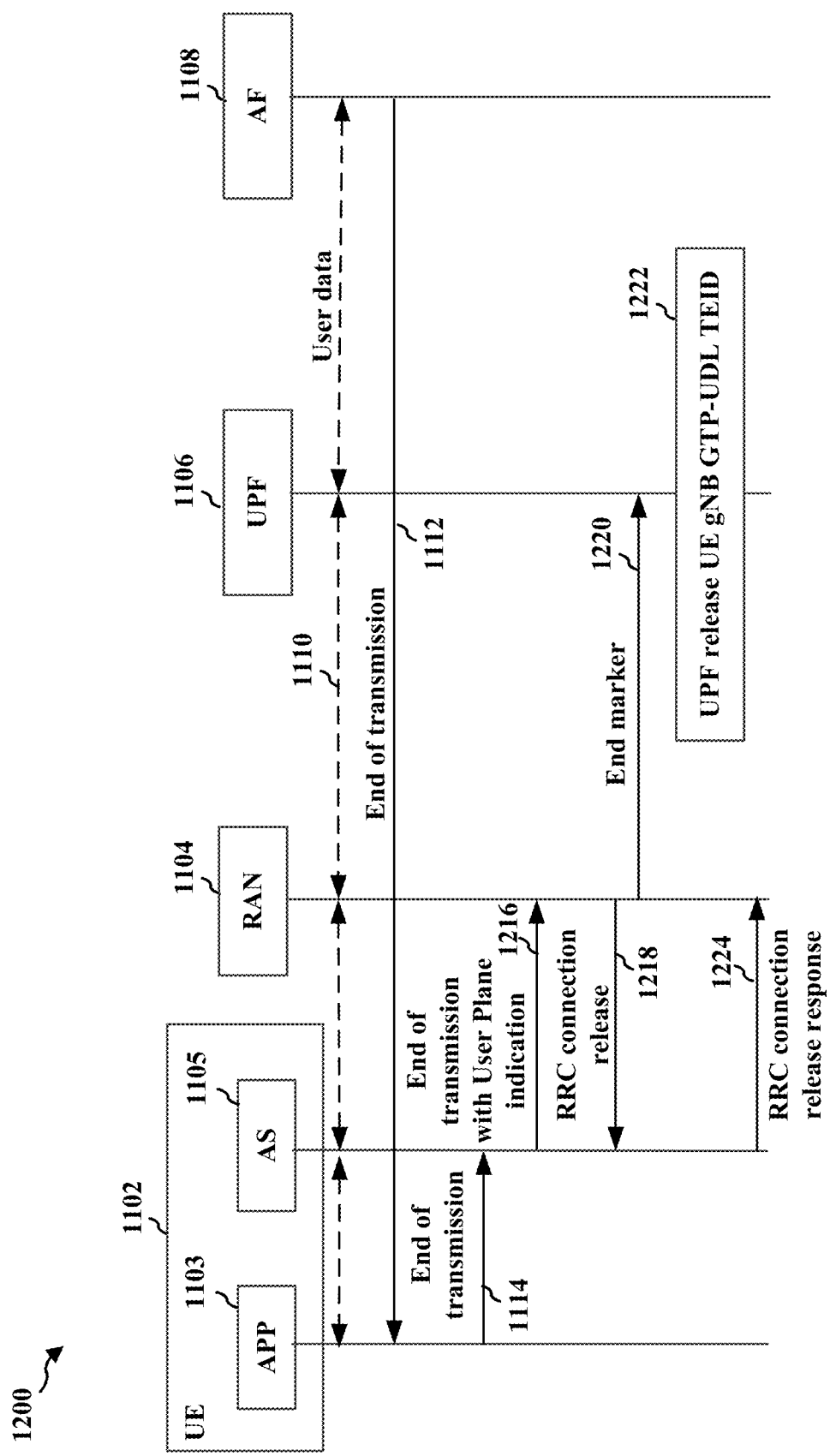
FIG. 12 illustrates example aspects of a UE initiated release over a user plane.

The indication of the end of transmission 1114 in FIG. 11 may be made over the user plane from the AS layer 1105 to the RAN 1104, as described in connection with FIG. 12. FIG. 12 illustrates an example 1200 related to FIG. 11 which shows an end of transmission indication 1216 sent from the AS layer of the UE 1102 to the RAN 1104, e.g., over the user plane. Aspects from FIG. 11 are given the same reference numbers.

The end of transmission indication 1216 may be sent in any of a Packet Data Convergence Protocol (PDCP) header, a Packet Data Convergence Protocol (PDCP) control Protocol Data Unit (PDU), a Radio Link Control (RLC) control PDU, a Medium Access Control (MAC) header, or a MAC control PDU.

In response to receiving the end of transmission indication 1216 from the UE 1102 over the user plane, the RAN 1104 can determine to release the UE 1102, e.g., by sending an RRC connection release at 1218, and notify to the UPF 1106 that the UE is released. For example, the RAN may send an end marker 1220 to the UPF 1106 to notify the UPF 1106 that the UE is released. The UPF 1106 may then release the GPU tunnel for the UE, e.g., releasing the UE gNB DL GTP-U TEID, at 1222. The UE may respond to the connection release 1218 with a connection release response 1224. The connection release between the UE and RAN may comprise an RRC connection release.

If any additional downlink data comes for the UE after that point, the UPF 1106 will notify an AMF to page the UE 1102 and to establish a new connection.

Figure 13:
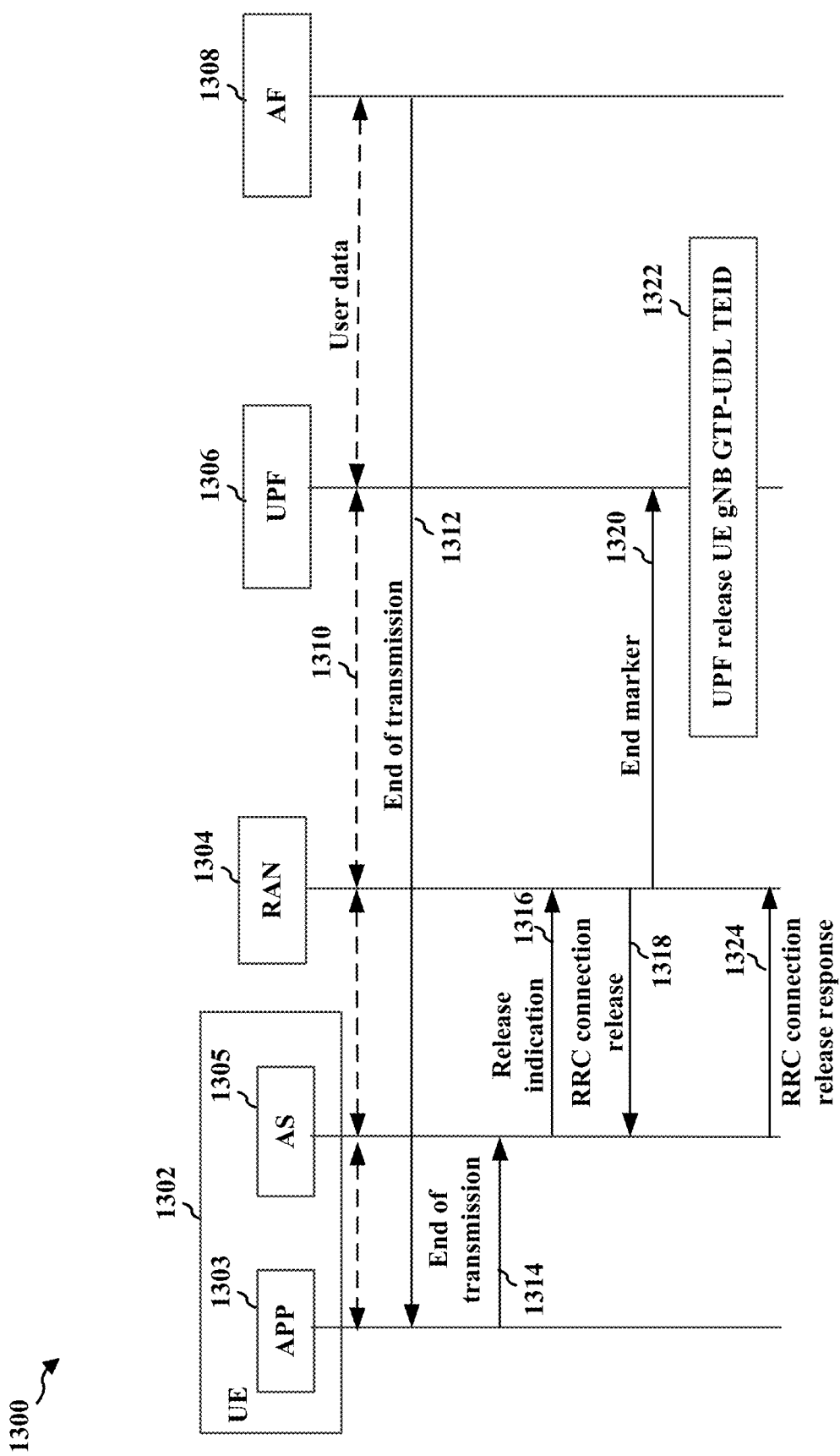
FIG. 13 illustrates example aspects of a UE initiated release over Radio Resource Control (RRC) signaling.

FIG. 13 illustrates aspects of an example 1300 in which a UE 1302 (e.g., UE 1012) initiates the release by sending release assistance information, e.g., RAI, to the RAN 1304 (e.g., 1016). In this example, the indication may be sent over RRC signaling rather than over the user plane, as was performed in FIG. 12. In FIG. 13, the UE 1302 communicates user data at 1310 over the user plane with AF 1308.

The user data may be communicated between the UE and the AF via UPF 1306 (e.g., SDC-UPF 1002) and RAN 1304, (e.g., RAN 1016), as described in connection with FIG. 10.

When there is no additional data to transmit and/or receive, the UE application layer 1303 may indicate an end of the transmission(s), e.g., by sending a release indication 1316 to the RAN 1304, e.g., via an AS layer 1305. The data to transmit can refer to uplink data and the data to receive may refer to downlink data from AF. The APP layer 1303 of the UE may inform the AS layer 1305 regarding the end of transmission 1314. The end of transmission may indicate that no more uplink data from the UE and/or no more downlink data is expected from the AF 1308. Thus, as described in connection with FIG. 11, the UE may receive an end of transmission indication 1312 regarding the end of downlink transmission from the AF 1308. The UE may respond by providing the release indication 1316 to the RAN notifying the RAN that no additional downlink data is expected from the AF.

The release indication 1316 may be sent from the UE 1302 to the RAN 1304 based on RRC signaling. The UE release indication may indicate to the base station, e.g., RAN 1304, that the UE is willing to be released. The RAN may then release the UE at 1318 with an RRC connection release message. The RAN may also notify the UPF regarding the release of the UE 1302, e.g., by sending an end marker 1320. The UPF 1306 may then release the GPU tunnel for the UE, e.g., releasing the UE gNB DL GTP-U TEID, at 1322. The UE may respond to the RRC connection release 1318 from the RAN with an RRC connection release response 1324.

Similar to the example in FIG. 12, if any additional downlink data comes for the UE after that point, the UPF 1306 will notify an AMF to page the UE 1302 and to establish a new connection.

Figure 14:
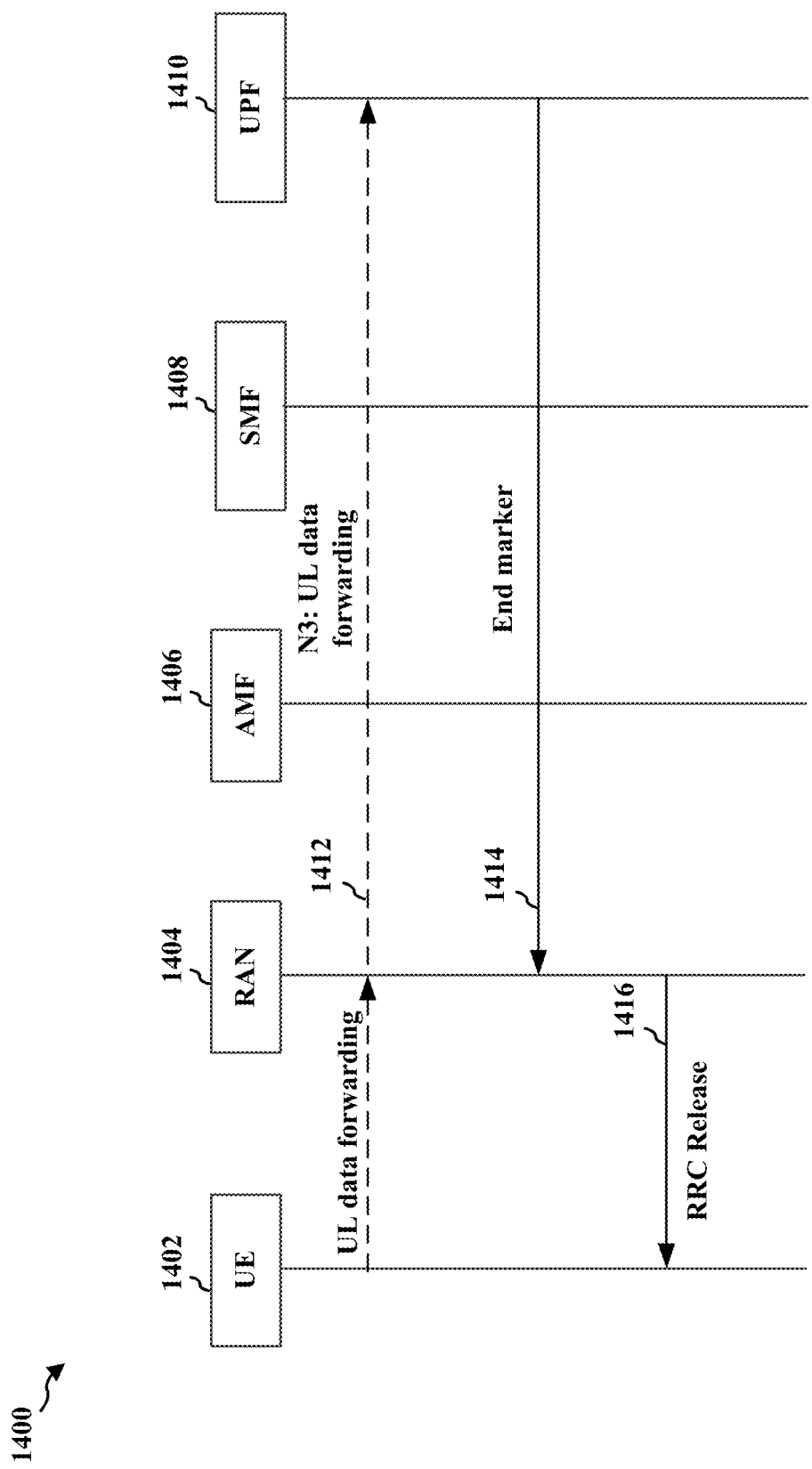
FIG. 14 illustrates example aspects of a UPF initiated release over a user plane.

FIG. 14 illustrates aspects of an example 1400 in which a UPF 1410, e.g., SDC-UPF 1002, initiates a release of UE 1402 (e.g., 1012) by sending an indication to the RAN 1404 (e.g., 1016). In this example, the indication may be sent via an GTP-U message end marker informing the RAN about the end of a transmission.

In FIG. 14, the UE 1402 communicates data at 1412 over the user plane with AF via UPF 1410, as described in connection with FIG. 10. The communication may be forwarded SMF 1408 (e.g., SDC-SMF 1008) and RAN 1404, (e.g., RAN 1016), as described in connection with FIG. 10. AMF 1406 (e.g., AMF 1010) is illustrated but may consider the UE in an idle mode, as the AMF might not be involved in the communication 1412. FIG. 14 illustrates uplink data forwarding 1412 from the UE, which may be forwarded from RAN 1404 to UPF 1410 over N3. At 1414, the UPF 1410 may send an indication, e.g., an end marker, to the RAN 1404 to release the UE. The indication from the UPF may notify the RAN that there is no additional downlink data to be transmitted to the UE, e.g., from an AF. The indication 1414 may comprise an end marker message and may be sent to the RAN 1404 after the UPF sends the last G-PDU communicated on a GTP-U. The indication may also be sent without any downlink data traffic, e.g., separately from the downlink data traffic. Thus, for NIDD over a T8 interface, the AF (e.g., 1004) may notify the UPF 1410 (e.g., SDC-UPF 1002) regarding an end of a downlink data transmission. The UPF 1410 may then indicate fast release information to the RAN 1404, which may respond by releasing the UE (sending RRC release 1416), e.g., when the RAN 1404 determines that there are no data to be sent to/sent by the UE.

Figure 15:
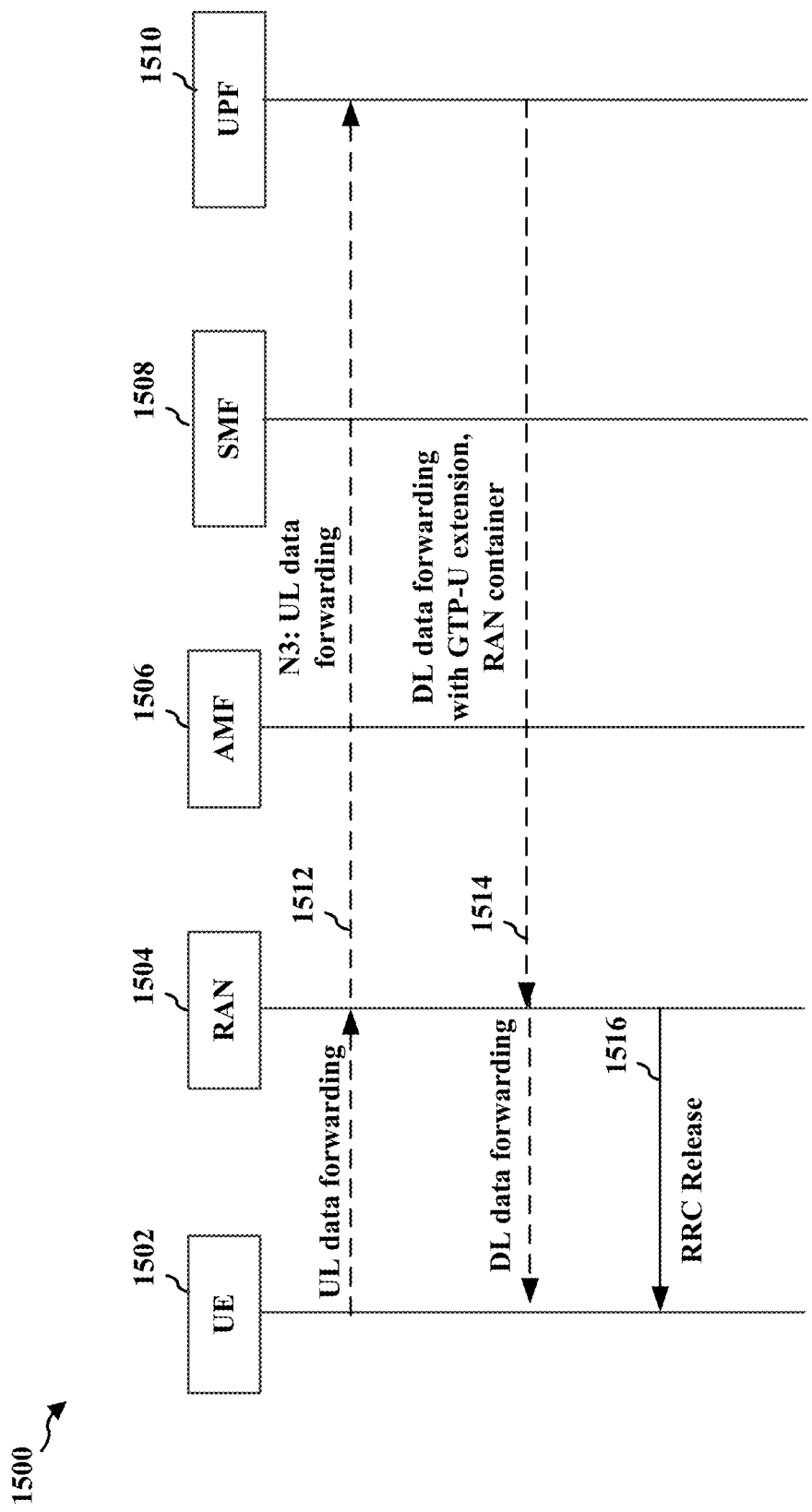
FIG. 15 illustrates example aspects of a UPF initiated release over a user plane.

FIG. 15 illustrates aspects of an example 1500 in which a UPF 1510, e.g., SDC-UPF 1002, initiates a release of UE 1502 (e.g., 1012) by sending an indication to the RAN 1504 (e.g., 1016) about an end of a downlink data transmission to the UE. In this example, the indication may be sent via a GTP-U extension header. In FIG. 15, the UE 1502 communicates data, at 1512, over the user plane with an AF via UPF 1510, as described in connection with FIG. 10. The communication may be forwarded by SMF 1508 (e.g., SDC-SMF 1008) and RAN 1504, (e.g., RAN 1016), as described in connection with FIG. 10. AMF 1506 (e.g., AMF 1010) is illustrated but may consider the UE in an idle mode, as the AMF might not be involved in the communication 1512. Data communication 1512 comprises uplink communication. Similarly, data communication 1514 may comprise downlink data that is forwarded from the UPF 1510 to the UE 1502. The downlink data may be forwarded with an N3 interface GTP-U extension RAN container. A RAN container may be a GTP-U extension header transmitted in a G-PDU over an X2 user plane interface to convey control information related to the user data. The GTP-U extension RAN container may provide a context of dual connectivity/MR-DC, or more specifically, for X2/Xn user data bearers setup for E-RABs configured with the split bearer option. The RAN container can be sent to the RAN 1504 together with DL data traffic 1514.

Figure 16:
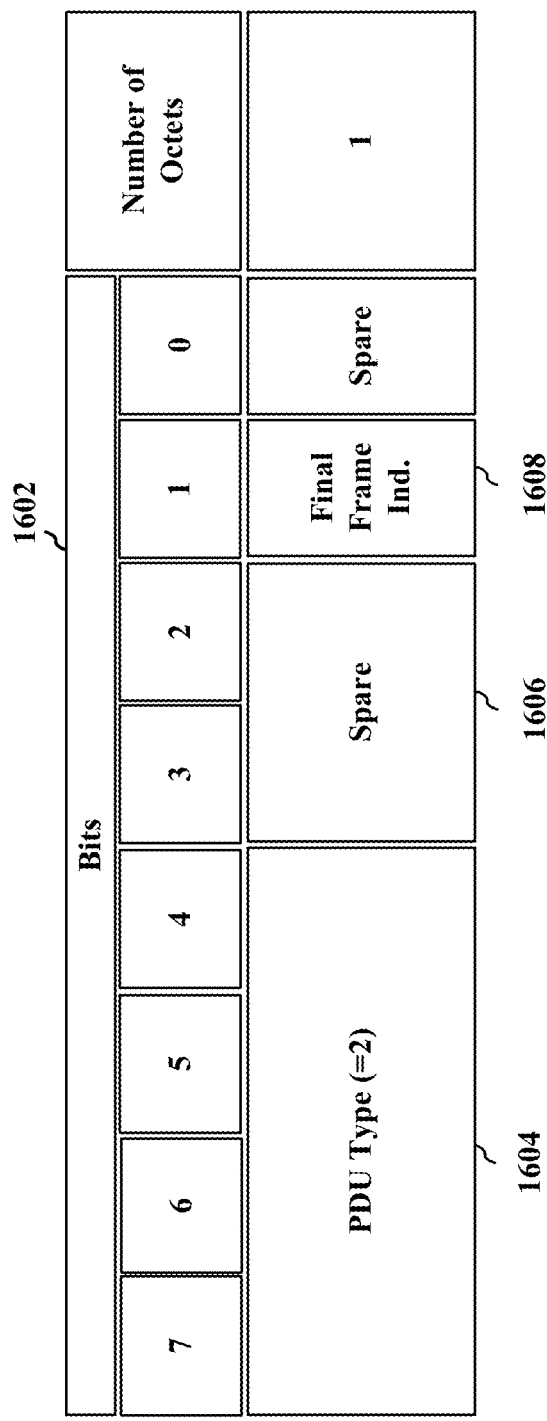
FIG. 16 illustrates aspects of an example General Packet Radio Service Tunneling Protocol User Plane (GTP-U) extension header.

FIG. 16 illustrates aspects of an example GTP-U extension header 1602. The GTP-U extension header may comprise a RAN container for indicating an end of data. In FIG. 16, the PDU type 1604 is 2, which may indicate a final downlink frame. For example, PDU type 0 may indicate downlink user data. PDU type 1 may indicate downlink data delivery status, and PDU type 2 may indicate a final downlink frame. In FIG. 16, the spare field 1606 is set to "0" by the sender, and therefore may not be interpreted by the receiver. The final frame indication 1608 may include a parameter, e.g., at least one bit, that indicates whether the frame is the last downlink frame. For example, a "0" may indicate that the frame is not the final frame, whereas a "1" may indicate that the frame is the final downlink frame.

Based on receiving the indication, the RAN may release the UE at 1516, e.g., via an RRC connection release.

Figure 17:
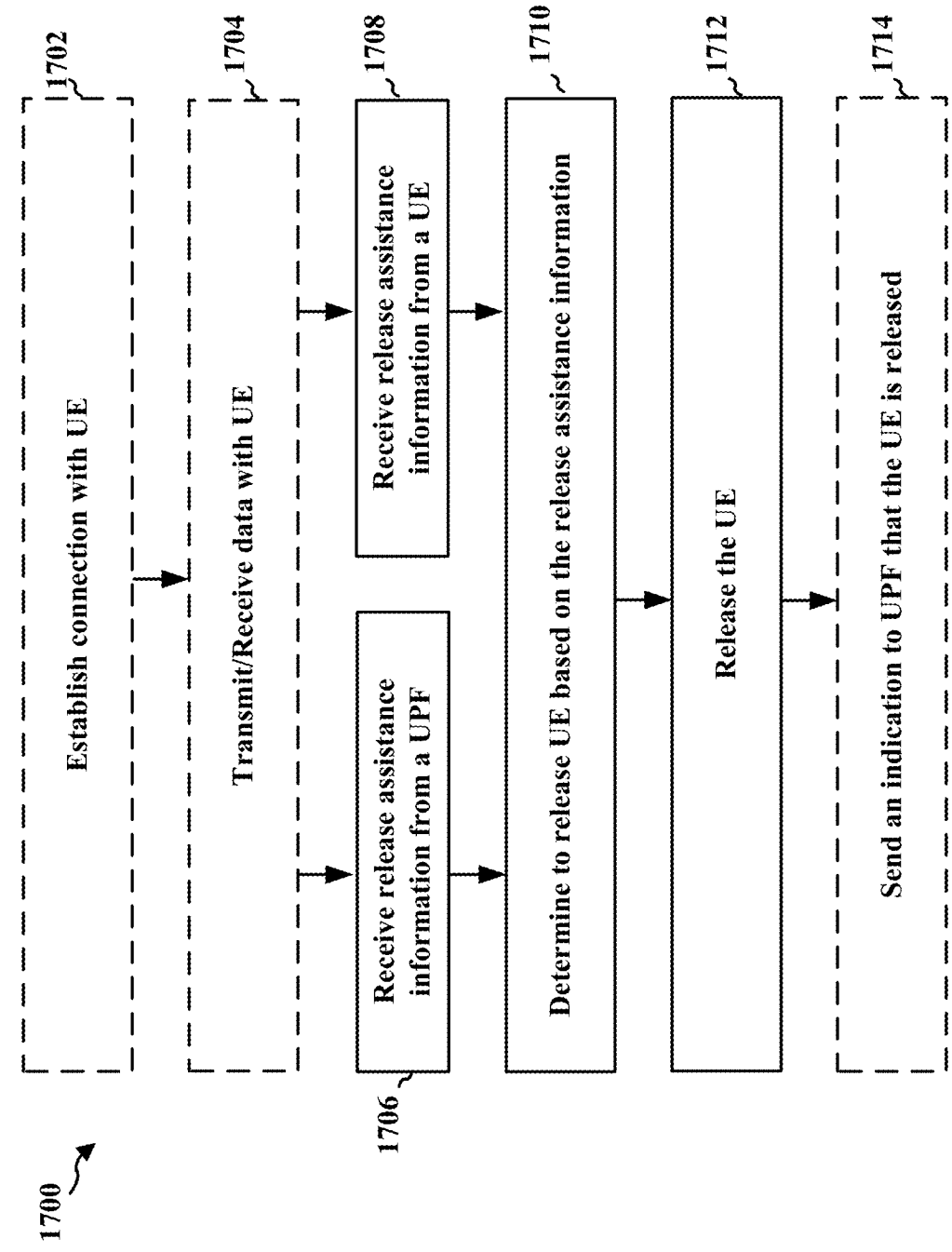
FIG. 17 is a flowchart of a method of wireless communication.

FIG. 17 is a flowchart 1700 of a method of wireless communication. The method may be performed by a network including a base station (e.g., base station 102, 180, 310, the apparatus 1802, 1802') to release a UE (e.g., UE 104, 350, 402, 512, 602, 702, 802, 902, 1012, 1102, 1302, 1402, 1502, 1850). Optional aspects are illustrated with a dashed line. The method enables a RAN to determine, at times, to release a connection with a UE in a more efficient manner, enabling the UE to achieve power savings. The network may establish a connection with the UE, at 1702, in order to transmit/receive data with the UE, at 1704. The uplink and downlink communication may be NIDD or IP data communicated over a control plane and/or over a user plane, as described in connection with FIGS. 5 and 10.

A RAN may receive release assistance information that is used by the RAN to determine whether to release the UE. The release assistance information may comprise any of the indications, e.g., 1216, 1316, 1414, and/or 1514, described in connection with FIGS. 12-15.

As illustrated at 1708, the RAN may receive the release assistance information from the UE itself, e.g., at 1708. For example, when there is no uplink data to transmit, a UE application layer may notify the RAN regarding the end of the uplink transmission. As illustrated in FIG. 12, the UE's application layer 1103 may notify the AS layer about the end 1114 of an UL transmission. The UE may then send an indication 1216 of the end of the transmission to the RAN, e.g., base station 1104. In addition to or alternately to informing the RAN about the end of an UL transmission, the UE may notify the RAN regarding the end of UL and/or DL transmission. For example, an AF 1108 may indicate 1112 an end of DL data transmission to the UE application layer 1103. The UE application layer 1103 may then notify the AS layer(s) about the end of the UL and/or DL transmission(s), and the UE may provide release assistance information to the base station 1104 indicating the end of the UL and/or DL transmission(s). The RAN may receive the assistance information from the UE over a user plane. The indication may be comprised in any of a PDCP header, a PDCP control PDU, a RLC control PDU, a MAC header, and/or a MAC control PDU.

In another example, the RAN may receive the release assistance information from the UE, at 1708, over RRC signaling. The RRC signaling may indicate to the RAN that the UE is willing to be released. FIG. 13 illustrates an example 1316 of release assistance information that may be received by the RAN from the UE in RRC signaling.

The RAN may receive the release assistance information, at 1706, from a UPF involved in an active session with the UE. The UPF may comprise a SDC-UPF, and the release assistance information may be provided to the RAN from the application function via the SDC-UPF. As an example, for NIDD provided from the application function to the UPF over T8, the application function may notify the UPF about an end of a DL data transmission. The UPF may then provide the release assistance information to the RAN, e.g., over a user plane, e.g., as described in connection with FIGS. 14-16.

The release assistance information may be received by a RAN from an SDC-UPF over a user plane, such as the end marker 1414 described in connection with FIG. 14. Thus, the indication may comprise a GTP-U message end marker. The GTP-U message end marker may be received after a final G-PDU communicated on a GTP-U. The GTP-U end marker may be received separately from data traffic from the UPF. Being received separately means that the GTP-U end marker may be received in a separate message from the data traffic.

The release assistance information may be contained in a RAN container as an extension header, the extension header being comprised in a GTP-U message. For example, the release assistance information may comprise a final frame indication in the GTP-U extension header, as described in connection with FIGS. 15 and 16. As an example, the final frame indication may be comprised in a field in the GTP-U extension header. The RAN container may be received together with DL data traffic.

At 1710, the RAN determines to release the UE based on the release assistance information received from the AF at 1706 and/or received from the UE at 1708. The UE may be released based on a determination that additional MO traffic is not present at the UE and/or that additional MT traffic is not destined for the UE based on the indication received at 1706 from the AF and/or at 1708 from the UE. For example, the RAN (e.g., 604, 704) may determine to release the user equipment at 1710 when the RAN determines that there are no active PDU sessions with the user equipment. Thus the release may be RAN based rather than NAS based. Thus, the indication may be received at 1706 from the user equipment by a RAN over a user plane, e.g., as described in connection with FIGS. 10-13.

Then, at 1712, the RAN releases the UE. In addition to releasing the UE, the RAN may send an indication to the UPF, at 1714, that the UE is released. This may trigger the UPF to release a DL GTP-U TED for the UE and the base station. After the release by the UPF, any DL data that is received for transmission to the UE may require the UPF to notify the AMF to page the UE.

Figure 18:
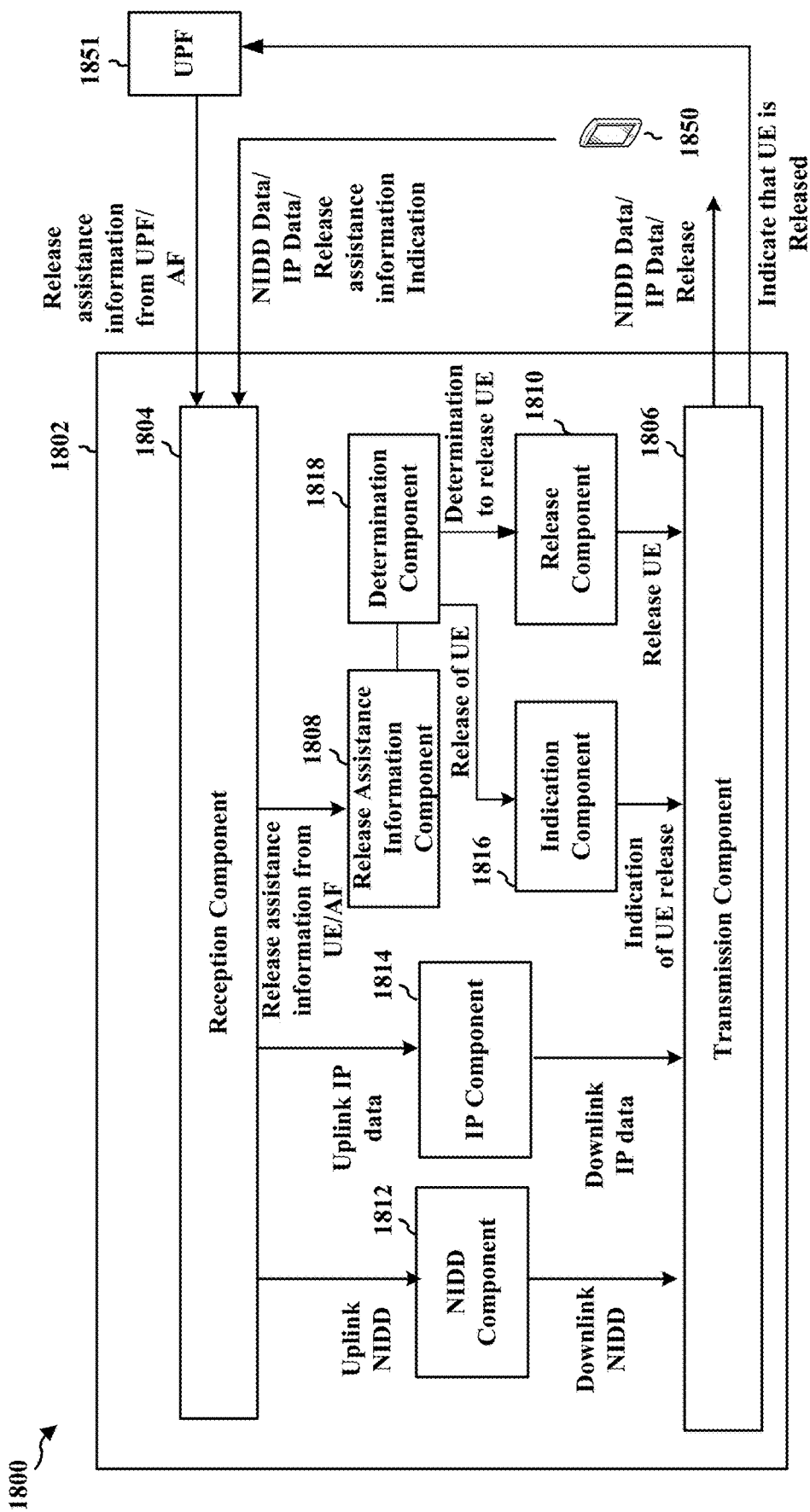
FIG. 18 is a conceptual data flow diagram illustrating the data flow between different means/components in an exemplary apparatus.

FIG. 18 is a conceptual data flow diagram 1800 illustrating the data flow between different means/components in an exemplary apparatus 1802. The apparatus may be a network device, including base station (102, 180, 310, etc.). The apparatus includes a reception component 1804 that receives uplink communication from UE 1850 and a transmission component 1806 that transmits downlink communication to the UE 1850. The uplink and downlink communication may be NIDD or IP data communicated over a control plane and/or over a user plane, as described in connection with FIGS. 5 and 10. The apparatus may include release assistance information component 1808 configured to receive an release assistance information, over at least one of a control plane or a user plane, from at least one of UE 1850 or an UPF/AF having an active session with the UE, e.g., as described in connection with 1706, 1708 from FIG. 17. The apparatus may include a determination component 1818 configured to determine to release the UE based on the release assistance information received from the UE 1850 or UPF 1851, e.g., as described in connection with 1710 from FIG. 17. The apparatus may include a release component 1810 configured to release the user equipment based on the determination from the determination component 1818. As described in connection with FIG. 17 at 1704, the apparatus may communicate data with the UE 1850 as NIDD over the control plane or user plane or as IP data over the control plane or user plane. Thus, the apparatus may include an NIDD component 1812 configured to communicate NIDD over a control plane or a user plane with UE 1850. Similarly, the apparatus may include an IP component 1814 configured to communicate IP data over a control plane or a user plane with UE 1850. The apparatus may further include an indication component 1816 configured to communicate any of the indication of the UE's release to the UPF 1851 described in connection with 1714.

The apparatus may include additional components that perform each of the blocks of the algorithm in the aforementioned flowcharts of FIGS. 4-17. As such, each block in the aforementioned flowchart of FIG. 17, and aspects in the flowcharts of FIGS. 4-16, may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
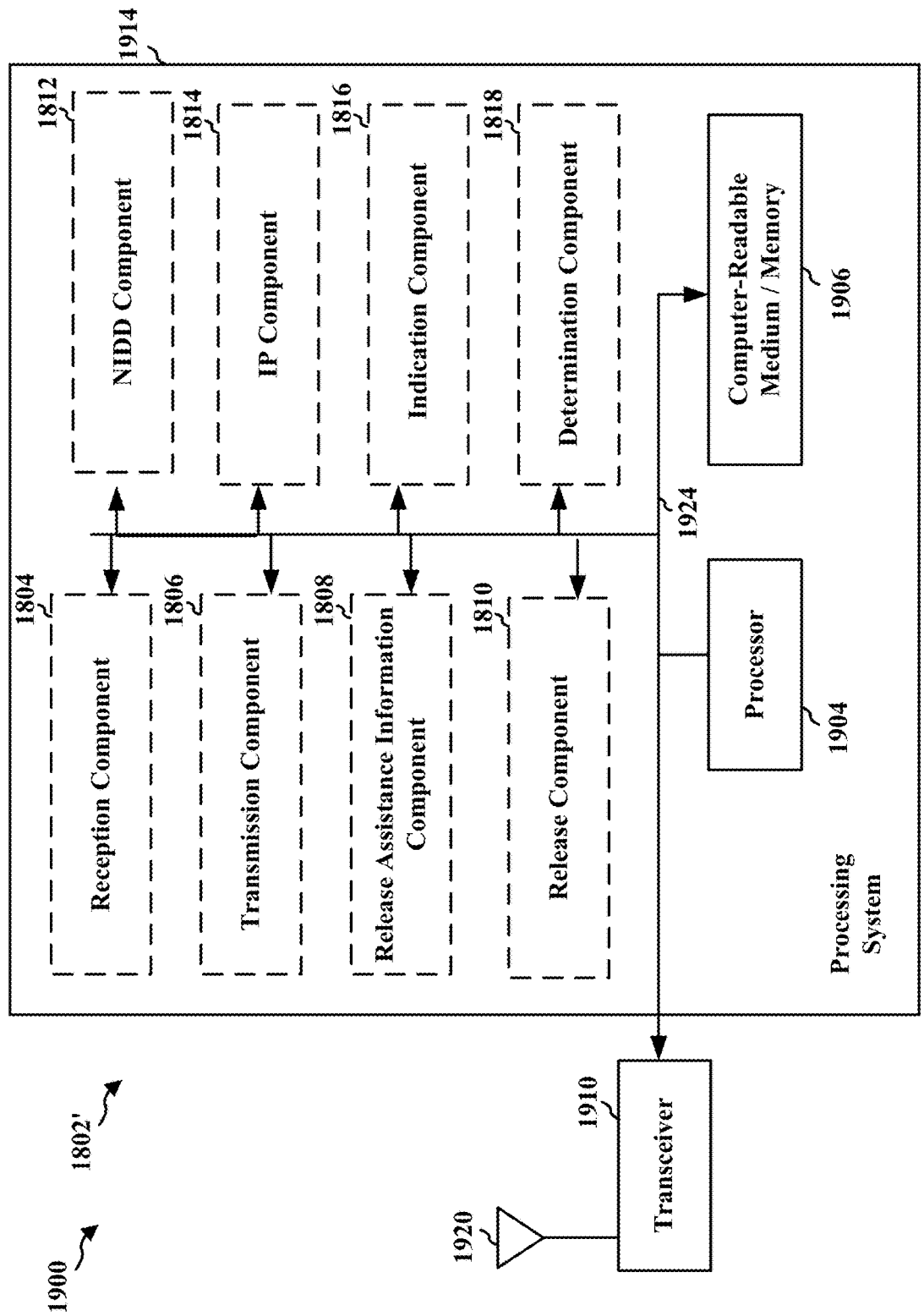
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, 1816, 1818, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1806, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814, 1816, 1818. The components may be software components running in the processor 1904, resident/stored in the computer readable medium/memory 1906, one or more hardware components coupled to the processor 1904, or some combination thereof. The processing system 1914 may be a component of the base station 310 and may include the memory 376 and/or at least one of the TX processor 316, the RX processor 370, and the controller/processor 375.

In one configuration, the apparatus 1802/1802' for wireless communication includes means for receiving release assistance information at a RAN from a UE or an application function having an active session with the UE (e.g., at least release assistance information component 1808); means for determining, at the RAN, to release the UE based on the release assistance information received from the UE or the application function (e.g., at least determination component 1818); means for releasing the UE (e.g., at least release component 1810); and means for sending an indication from the RAN to a User Plane Function (UPF) that the UE is released (e.g., at least indication component 1816). The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   receiving release assistance information via a user plane from an access stratum (AS) layer of a user equipment (UE); and
   releasing the UE if the release assistance information indicates an end of a data transmission by the UE.

2. The method of claim 1, wherein the release assistance information is associated with an application layer of the UE.

3. The method of claim 1, wherein the release assistance information is included in at least one of a medium access control (MAC) protocol data unit (PDU), a MAC header, a packet data convergence protocol (PDCP) header, a PDCP PDU, or a radio link control (RLC) PDU.

4. The method of claim 3, wherein the MAC PDU comprises a MAC control PDU or the PDCP PDU comprises a PDCP control PDU.

5. The method of claim 1, further comprising:
   transmitting, to the UE, an indication that the UE was released from a radio resource control (RRC) connection.

6. The method of claim 1, further comprising:
   transmitting, via a user plane function (UPF), an indication that the UE was released.

7. A base station, comprising:
   a reception component configured to receive release assistance information via a user plane from an access stratum (AS) layer of a user equipment (UE); and
   a processing system configured to release the UE if the release assistance information indicates an end of a data transmission by the UE.

8. The base station of claim 7, further comprising:
   a transmission component configured to transmit, via a user plane function (UPF), an indication that the UE was released.

9. The base station of claim 7, further comprising a transmission component configured to transmit to the UE, an indication that the UE was released from a radio resource control (RRC) connection.

10. The base station of claim 7, wherein the release assistance information is associated with an application layer of the UE.

11. The base station of claim 7, wherein the release assistance information is included in at least one of a medium access control (MAC) protocol data unit (PDU), a MAC header, a packet data convergence protocol (PDCP) header, a PDCP PDU, or a radio link control (RLC) PDU.

12. The base station of claim 11 wherein the MAC PDU comprises a MAC control PDU or the PDCP PDU comprises a PDCP control PDU.

13. A method of wireless communication at a User Equipment (UE), comprising:
    transmitting release assistance information via a user plane from an access stratum (AS) layer of the UE to a base station; and
    receiving release information from the base station based on the release assistance information indicating an end of a data transmission by the UE.

14. The method of claim 13, wherein the release assistance information originates at an application layer of the UE.

15. The method of claim 13, wherein the release assistance information is included in at least one of a medium access control (MAC) protocol data unit (PDU), a MAC header, a packet data convergence protocol (PDCP) header, a PDCP PDU, a radio link control (RLC) PDU, or radio resource control (RRC) signaling.

16. The method of claim 15, wherein the MAC PDU comprises a MAC control PDU or the PDCP PDU comprises a PDCP control PDU.

17. A user equipment (UE), comprising:
    a transceiver;
    a memory comprising instructions; and
    at least one processor configured to execute the instructions causing the UE to:
      transmit, via the transceiver, release assistance information over via a user plane from an access stratum (AS) layer of the UE to a base station; and
      receive, via the transceiver, release information from the base station based on the release assistance information indicating an end of a data transmission.

18. The UE of claim 17, wherein the release assistance information originates at an application layer of the UE.

19. The UE of claim 17, wherein the release assistance information is included in at least one of a medium access control (MAC) protocol data unit (PDU), a MAC header, a packet data convergence protocol (PDCP) header, a PDCP PDU, a radio link control (RLC) PDU, or radio resource control (RRC) signaling.

20. The UE of claim 19, wherein the MAC PDU comprises a MAC control PDU or the PDCP PDU comprises a PDCP control PDU.

\* \* \* \* \*